United States Patent [19]
Nakagawa et al.

[11] Patent Number: 5,828,520
[45] Date of Patent: Oct. 27, 1998

[54] MAGNETIC HEAD-MOUNTED TO A TIP PORTION OF A CARRIAGE VIA ADHESIVE IN AN ADHESIVE FILLING GROOVE

[75] Inventors: Takashi Nakagawa; Sadahiro Takahashi; Takayuki Sasaki, all of Fukushima-ken; Tetsuo Ando, Niigata-ken; Toru Sawada, Fukushima-ken, all of Japan

[73] Assignee: Alps Electric Co., Ltd., Tokyo, Japan

[21] Appl. No.: 704,483

[22] Filed: Aug. 28, 1996

[30] Foreign Application Priority Data

Sep. 13, 1995 [JP] Japan ................................. 7-235428

[51] Int. Cl.⁶ .............................. G11B 5/49; G11B 5/54
[52] U.S. Cl. ............................................ 360/104; 360/106
[58] Field of Search ..................................... 360/103–106

[56] References Cited

U.S. PATENT DOCUMENTS

| | | | |
|---|---|---|---|
| 4,882,644 | 11/1989 | Kimura et al. | 360/104 |
| 4,901,430 | 2/1990 | Noguchi et al. | 360/104 |
| 5,187,624 | 2/1993 | Shigemoto | 360/104 |
| 5,333,085 | 7/1994 | Prentice et al. | 360/104 |
| 5,442,504 | 8/1995 | Nagase et al. | 360/104 |
| 5,467,236 | 11/1995 | Hatanai et al. | 360/104 |
| 5,499,153 | 3/1996 | Uemura et al. | 360/103 |

*Primary Examiner*—Jefferson Evans
*Attorney, Agent, or Firm*—Guy W. Shoup; Patrick T. Bever

[57] ABSTRACT

The present invention relates to a head transferring mechanism of a magnetic recording/reproducing apparatus which transfers a magnetic head. In the head transferring mechanism 17 in which a hold case 19 is hinge-connected to a rear end portion of a carriage 18, a fitting bed 18p is formed on a central portion of the tip portion of the carriage 18 and an adhesive filling groove 18r and a clearance groove 18s are made in an upper surface of the fitting bed 18p to be close to each other. Further, after a lower magnetic head 20 is placed on the fitting bed 18p, a lower surface of the lower magnetic head 20 is adhered and fixed onto the fitting bed 18p through an adhesive 28 put in the adhesive filling groove 18r.

7 Claims, 25 Drawing Sheets

MAGNETIC HEAD-MOUNTED TO A TIP PORTION OF A CARRIAGE VIA ADHESIVE IN AN ADHESIVE FILLING GROOVE

BACKGROUND OF THE INVENTION

1. Field of the Invention

The present invention relates to a head transferring mechanism for use in a magnetic recording/reproducing apparatus, and more particularly to a fitting construction for a magnetic head to a carriage designed to reciprocate in radial directions of a magnetic disk.

2. Description of the Related Art

A magnetic recording/reproducing apparatus, being made to record and reproduce information in relation to a magnetic disk, is equipped with a head transferring mechanism which reciprocates in such a manner that a stepping motor serves as a drive source. As such a head transferring mechanism there has hitherto been known a construction where a lower magnetic head is mounted on a carriage designed to move back and forth in radial directions of a magnetic disk while an upper magnetic head is attached onto a hold case hinge-connected to a rear end portion of the carriage so that the upper magnetic head is elastically biased toward the lower magnetic head through a load spring stretched between the carriage and the hold case.

In this known head transferring mechanism, a flat metallic plate is adhered onto the carriage and the lower magnetic head is adhered to this metallic plate, which allows the lower magnetic head to be firmly attached through the metallic plate to the carriage. On the other hand, the upper magnetic head is elastically fitted through a gimbal spring or the like to the hold case. Accordingly, at recording and reproduction the upper magnetic head receives an adequate force to be brought into contact with the lower magnetic head with the magnetic disk being interposed therebetween.

There is a problem which arises with the above-mentioned prior magnetic recording/reproducing apparatus head transferring mechanism, however, in that complicated processes are required for fixing the lower magnetic head to the carriage, for that the metallic plate is adhered to the carriage after the circumferential edge portion of the lower magnetic head is adhered in advance to the metallic plate. For this reason, this mechanism is more difficult to assemble, and, because of the increased number of parts, is more expensive to manufacture.

SUMMARY OF THE INVENTION

The present invention has been developed with a view to eliminating this problem inherent in the prior art, and it is therefore an object of the present invention to provide a head transferring mechanism for a magnetic recording/reproducing apparatus which is capable of offering an excellent assembly operation concurrent with decreasing the number of parts to reduce the manufacturing cost.

For this purpose, an adhesive filling channel or groove is made in a tip portion of a carriage and a magnetic head is placed on the carriage to cross the adhesive filling groove. When the adhesive filling groove is filled with an adhesive, this adhesive makes the lower surface of the magnetic head fixedly adhered onto the carriage.

In this case, if a clearance groove is made in the vicinity of the adhesive filling groove to be overlapped in plane with a portion of the lower surface of the magnetic head, then the excessive adhesive flowing out of the adhesive filling groove along the lower surface of the magnetic head is reservoired within the clearance groove, with the result that a stress taking place at the hardening of the adhesive is less likely to be applied to the core of the magnetic head. Particularly, in the case that the clearance groove is made right under a thin-thickness portion of the core which is inferior in rigidity, the damage to the core due to the hardening of the adhesive is effectively avoidable.

Furthermore, in the case that the adhesive filling groove is positioned at a central portion of the lower surface of the magnetic head, the magnetic head can fixedly be adhered onto the carriage with a good balance. In addition, when an end portion of the adhesive filling groove is formed to have a larger width and this larger-width portion is located outside the magnetic head, this results in an improvement in work when placing the adhesive in the adhesive filling groove.

BRIEF DESCRIPTION OF THE DRAWINGS

The object and features of the present invention will become more readily apparent from the following detailed description of the preferred embodiments taken in conjunction with the accompanying drawings in which.

DESCRIPTION OF THE PREFERRED EMBODIMENT

A description will be made hereinbelow of an embodiment of the present invention with reference to the drawings.

Figure 1:
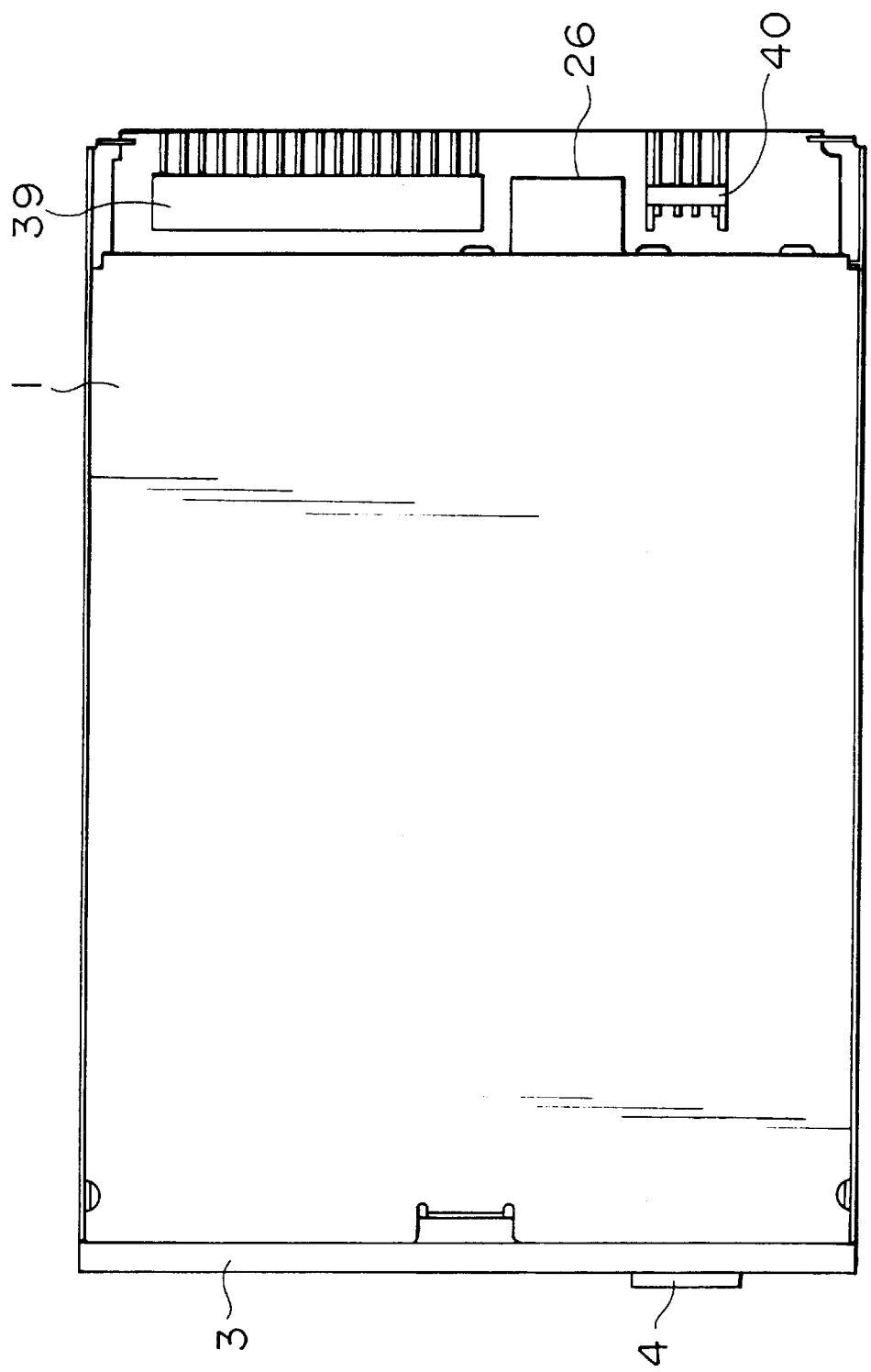
FIG. 1 is a plan view showing a magnetic recording/reproducing apparatus according to an embodiment of the present invention.
Figure 2:
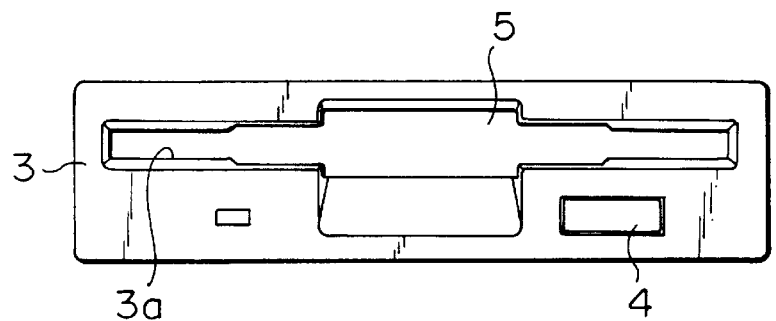
FIG. 2 is a front elevational view showing the same magnetic recording/reproducing apparatus.
Figure 3:
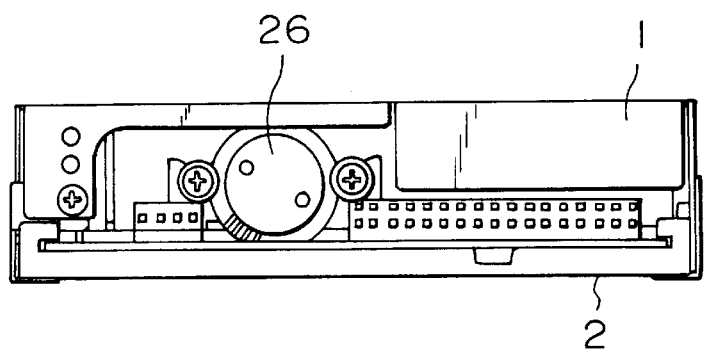
FIG. 3 is a rear elevational view showing the same magnetic recording/reproducing apparatus.
Figure 4:
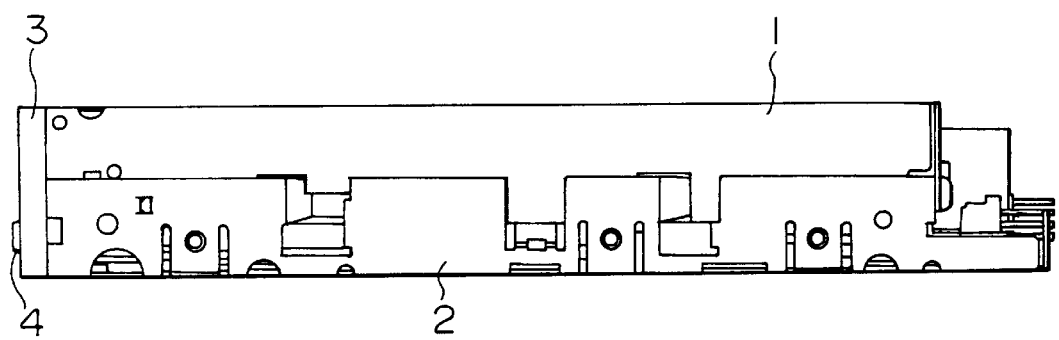
FIG. 4 is a side elevational view showing the same magnetic recording/reproducing apparatus.
Figure 6:
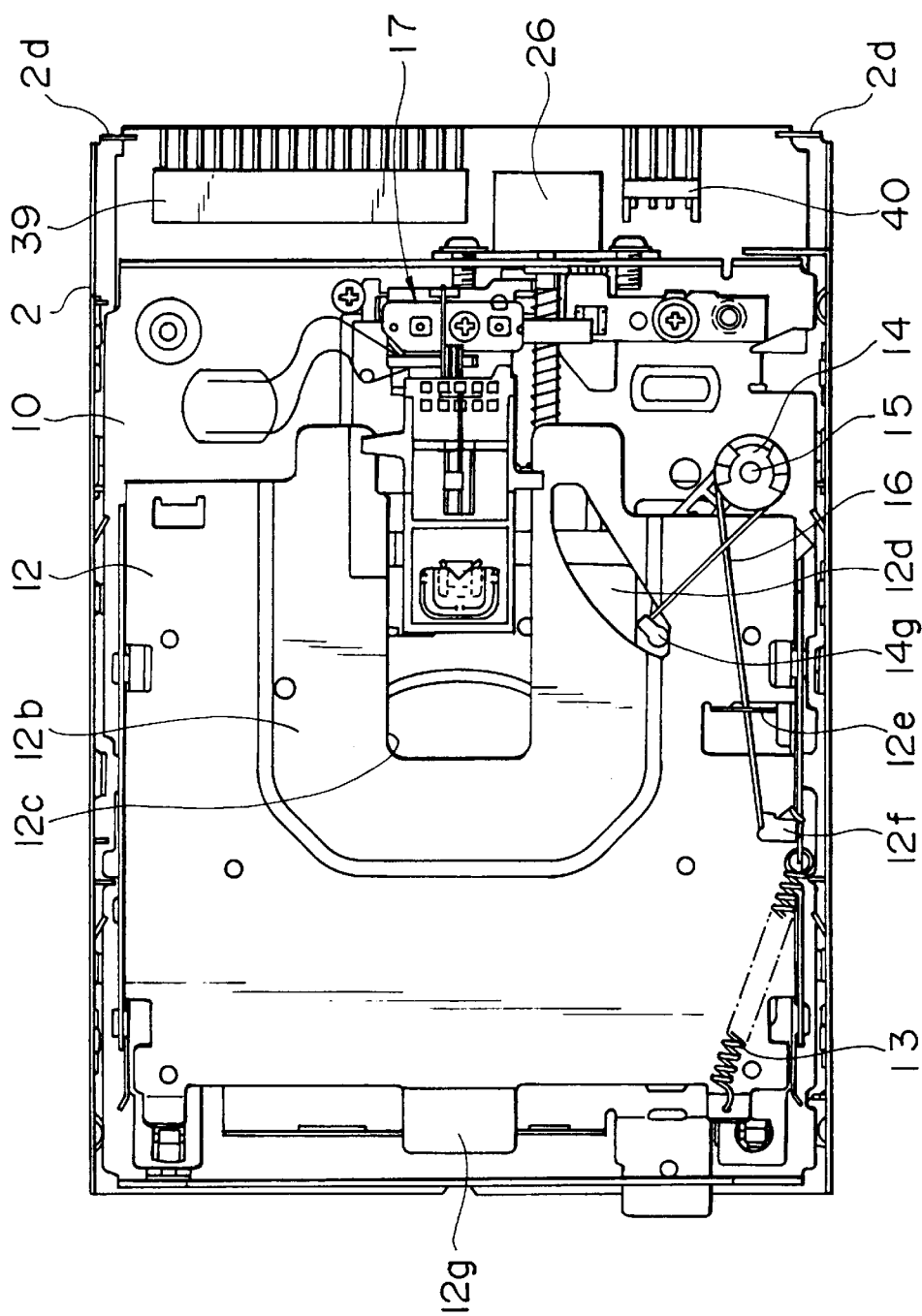
FIG. 6 is a plan view showing the FIG. 1 magnetic recording/reproducing apparatus from which an upper cover is detached.
Figure 7:
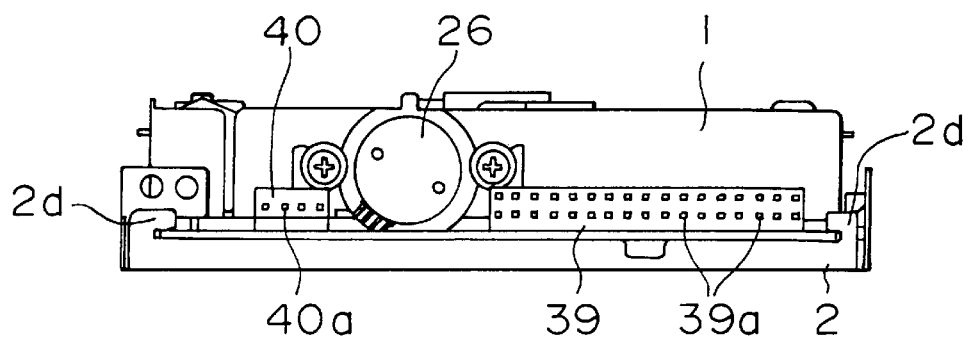
FIG. 7 is a rear elevational view showing the magnetic recording/reproducing apparatus.
Figure 8:
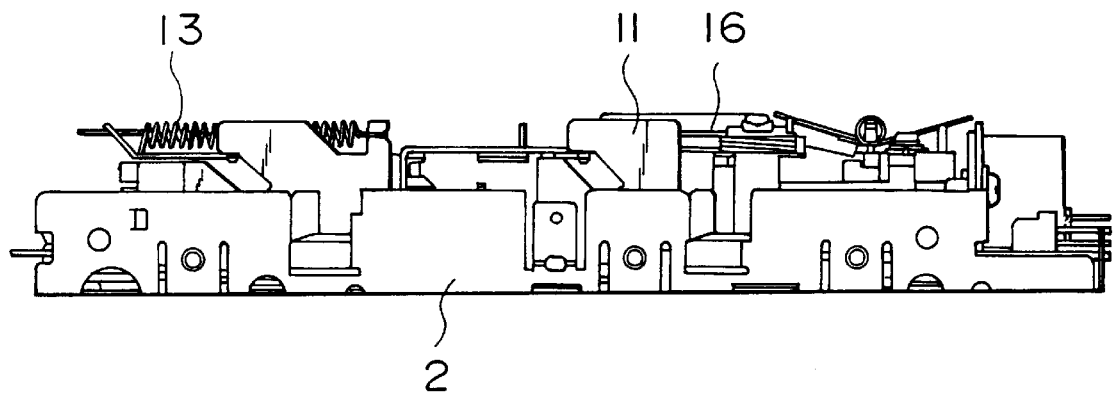
FIG. 8 is a side elevational view showing the magnetic recording/reproducing apparatus.
Figure 9:
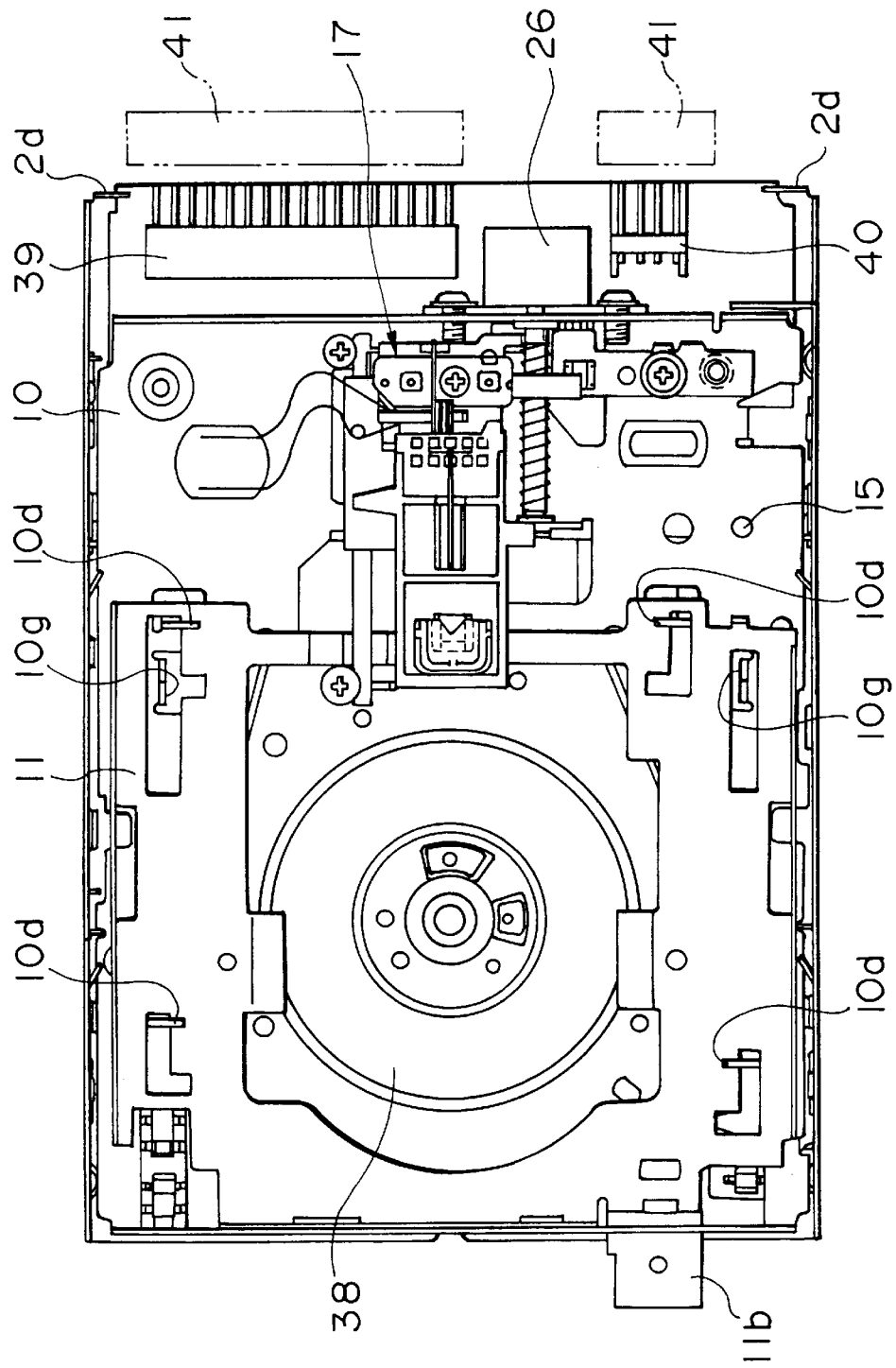
FIG. 9 is a plan view showing the FIG. 6 magnetic recording/reproducing apparatus from which a holder is removed.
Figure 10:
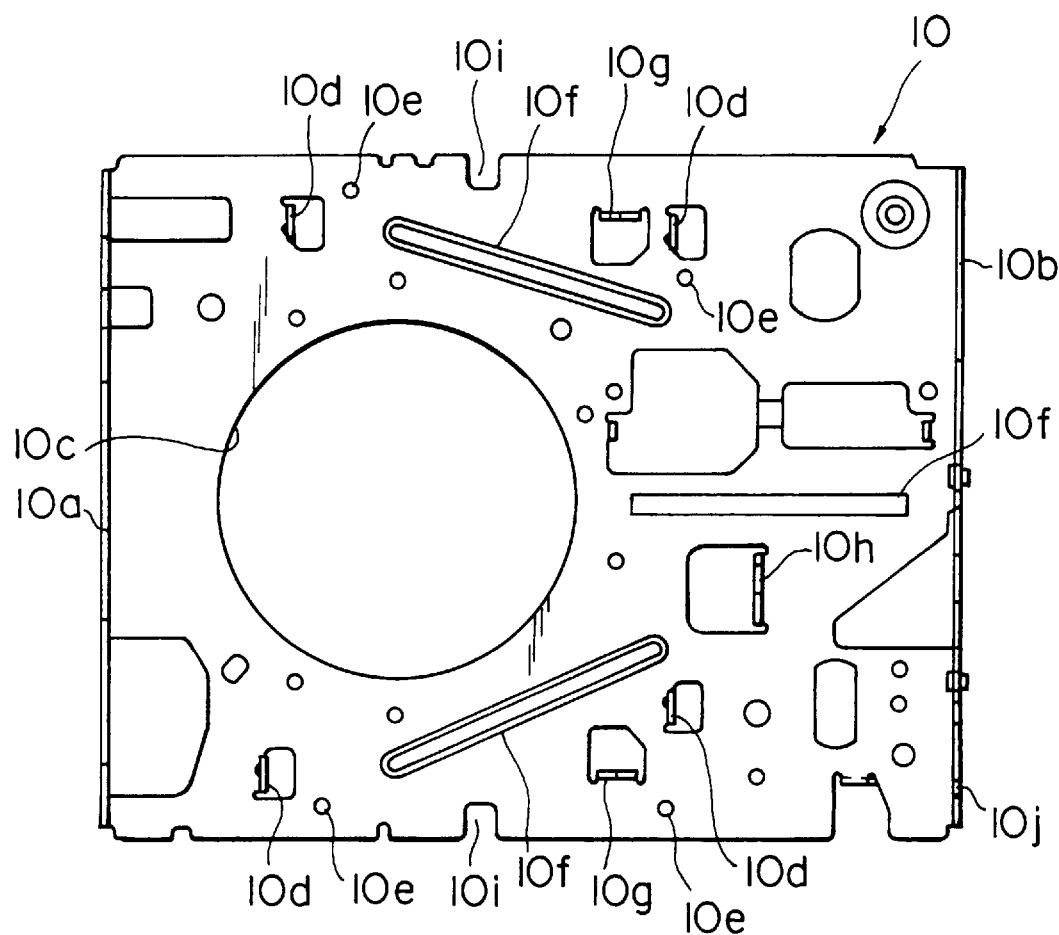
FIG. 10 is a plan view showing a chassis installed in the magnetic recording/reproducing apparatus.
Figure 11:
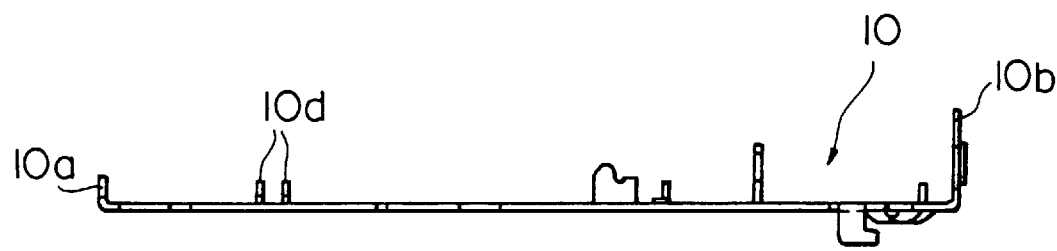
FIG. 11 is a side elevational view showing the same chassis.
Figure 12:
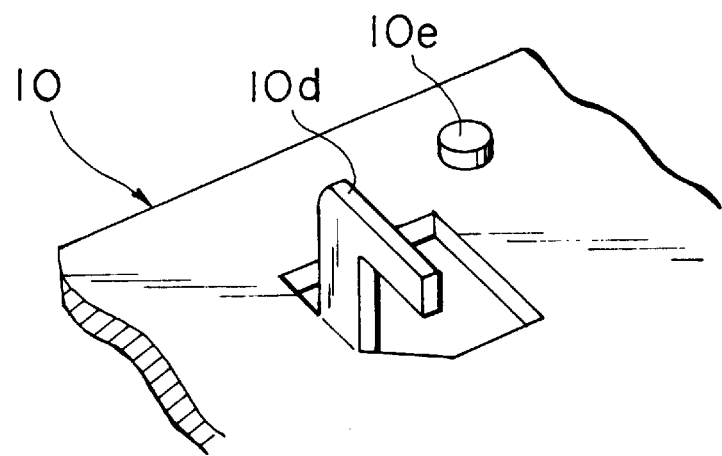
FIG. 12 is a perspective view showing a guide projection of the chassis and a protruding portion thereof.
Figure 13:
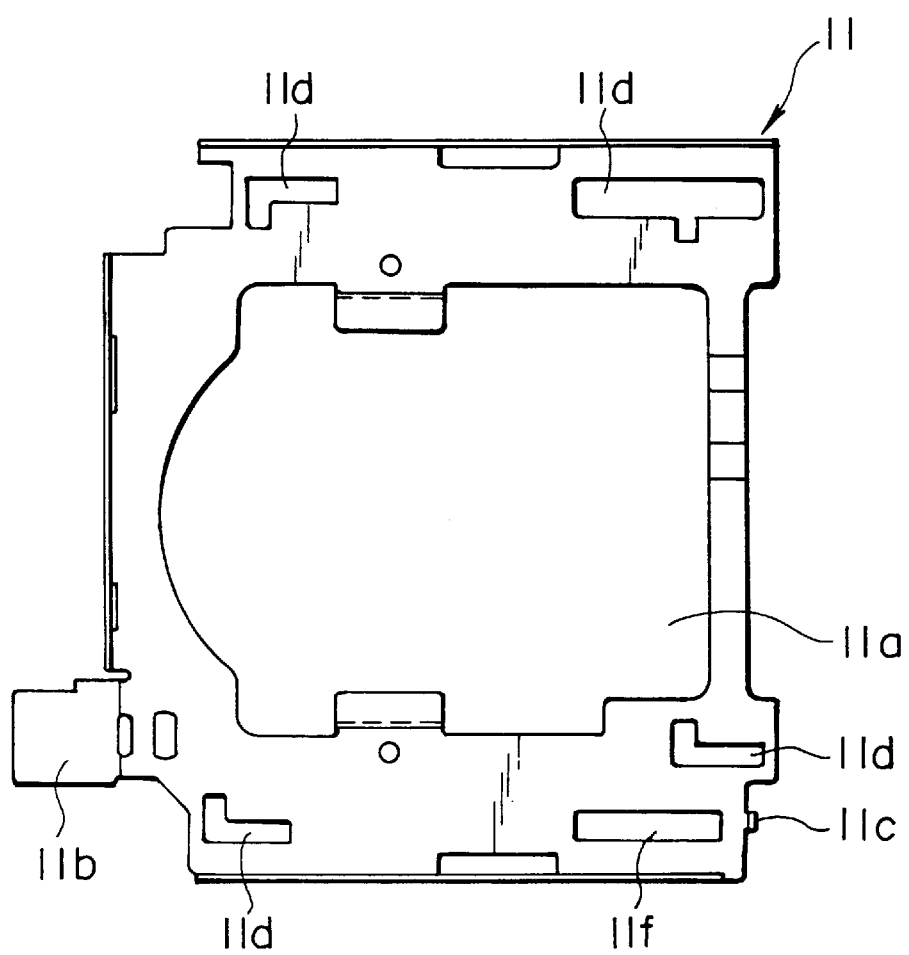
FIG. 13 is a plan view showing a slide plate fitted in the magnetic recording/reproducing apparatus.
Figure 14:
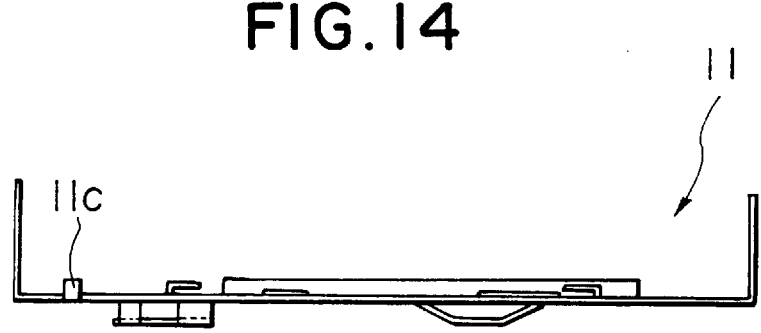
FIG. 14 is a rear elevational view showing the same slide plate.
Figure 15:
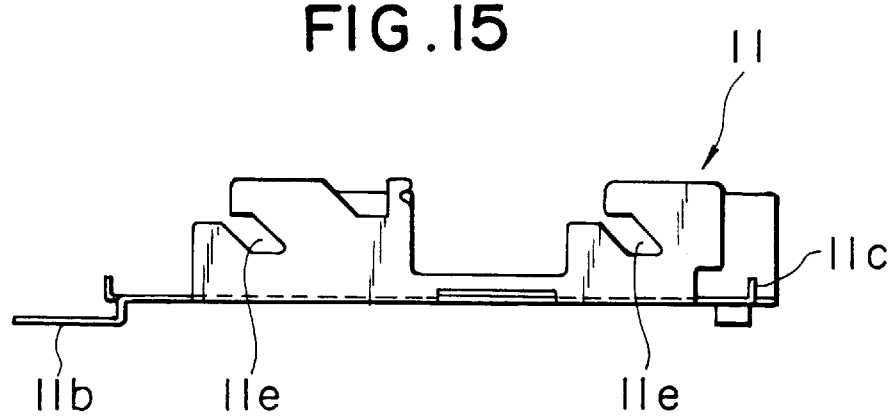
FIG. 15 is a side elevational view showing the same slide plate.
Figure 16:
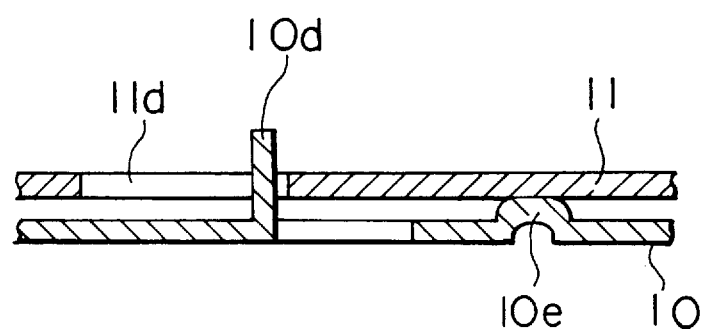
FIG. 16 is a cross-sectional view showing a state of an engagement between the chassis and the slide plate.
Figure 17:
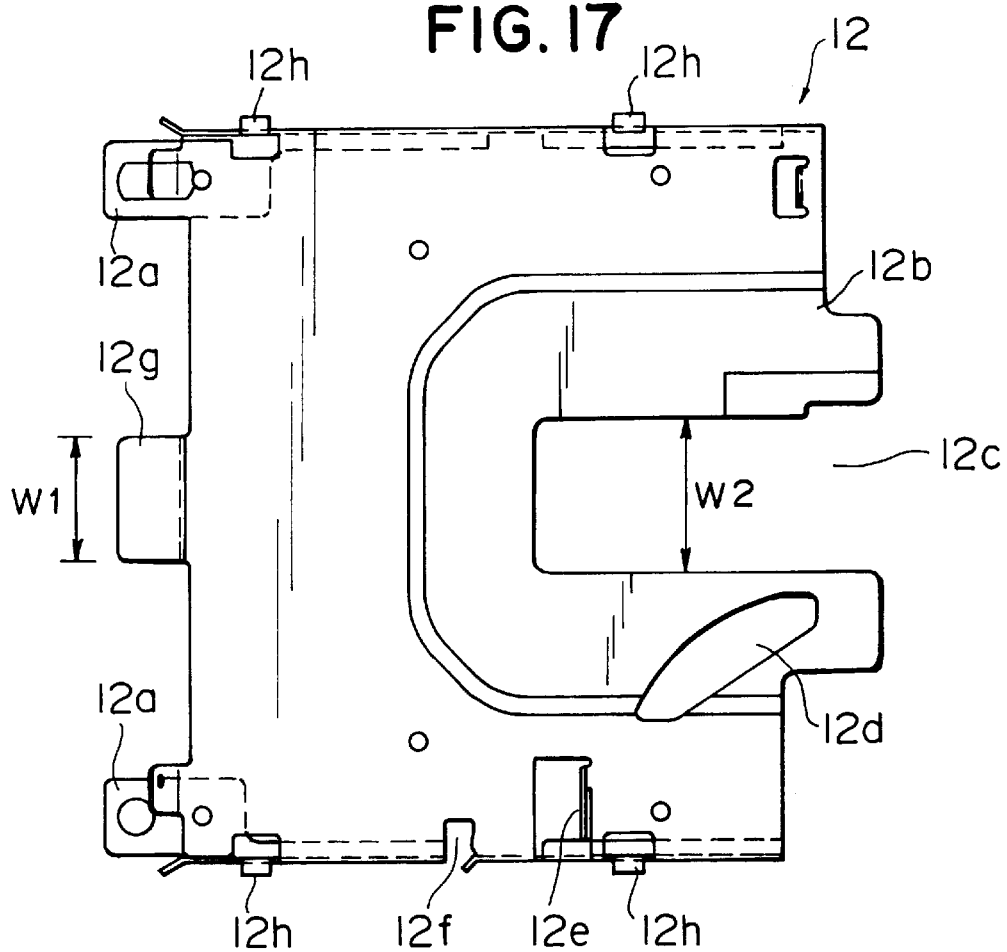
FIG. 17 is a plan view showing a holder installed in the magnetic recording/reproducing apparatus.
Figure 18:
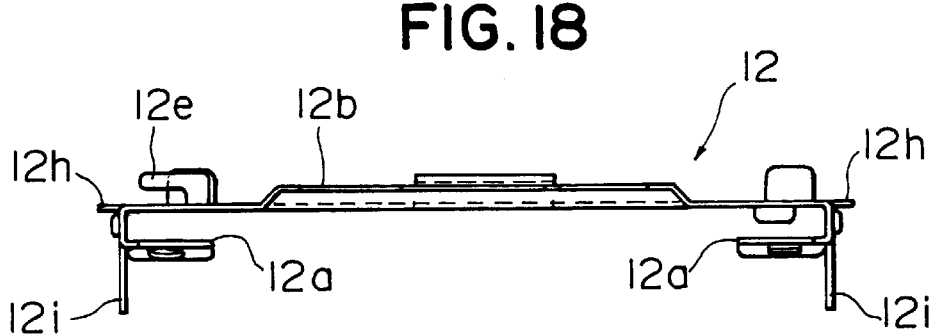
FIG. 18 is a rear elevational view showing the same holder.
Figure 19:
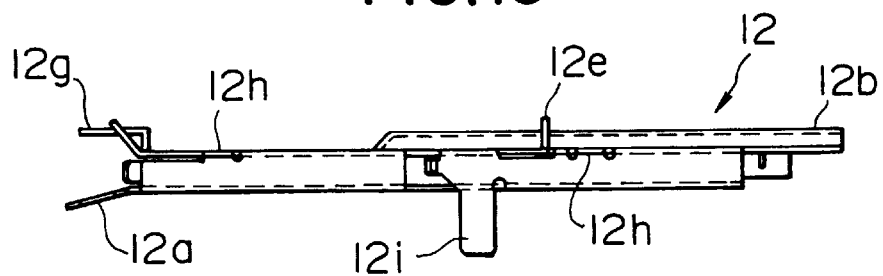
FIG. 19 is a side elevational view showing the same holder.
Figure 20:
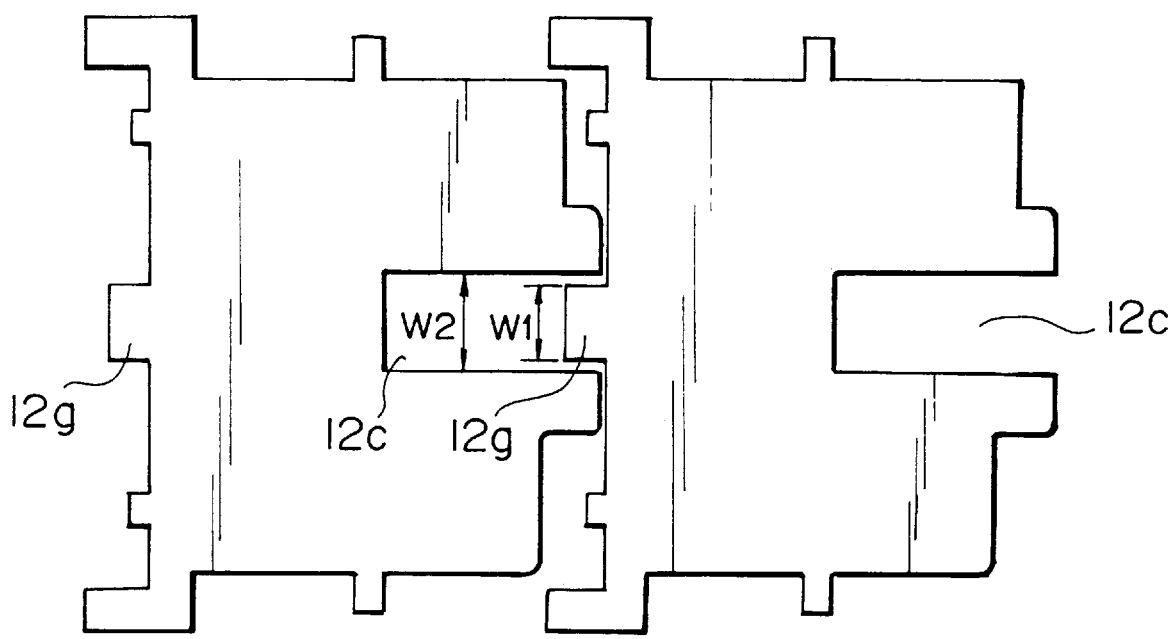
FIG. 20 is an explanatory view showing a state in which the same holder is drawn in its shape from a base material.
Figure 21:
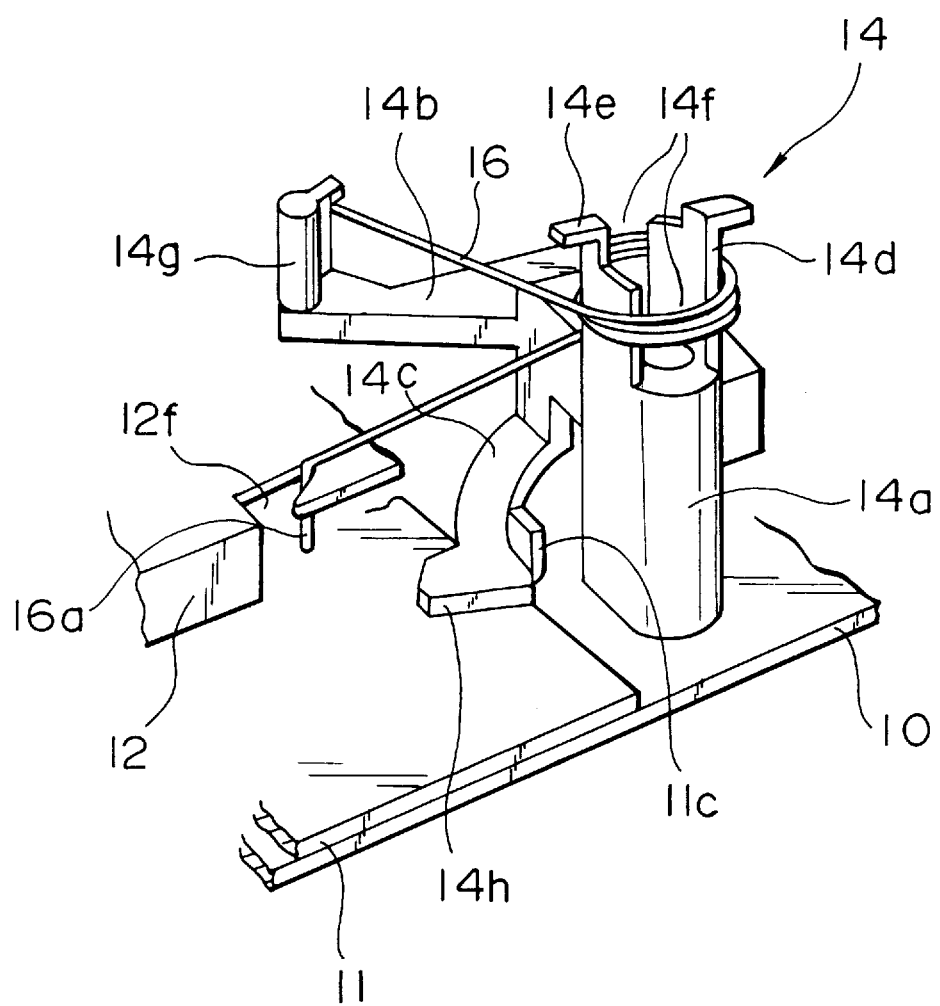
FIG. 21 is a perspective view showing a principal portion of a shutter opening and closing mechanism provided in the magnetic recording/reproducing apparatus.

FIGS. 1 to 47 are illustrations useful for describing an embodiment of this invention. Of these figures, FIG. 1 is a plan view showing a magnetic recording/reproducing apparatus, FIG. 2 is a front elevational view showing the same magnetic recording/reproducing apparatus, FIG. 3 is a rear elevational view showing the same magnetic recording/reproducing apparatus, FIG. 4 is a side elevational view showing the same magnetic recording/reproducing apparatus, FIG. 5 is a plan view showing a disk cartridge, FIG. 6 is a plan view showing the FIG. 1 magnetic recording/reproducing apparatus from which an upper cover is detached, FIG. 7 is a rear elevational view showing the magnetic recording/reproducing apparatus, FIG. 8 is a side elevational view showing the magnetic recording/reproducing apparatus, FIG. 9 is a plan view showing the FIG. 6 magnetic recording/reproducing apparatus from which a holder is removed, FIG. 10 is a plan view showing a chassis, FIG. 11 is a side elevational view showing the same chassis, FIG. 12 is a perspective view showing a guide projection of the chassis and a protruding portion thereof, FIG. 13 is a plan view showing a slide plate, FIG. 14 is a rear elevational view showing the same slide plate, FIG. 15 is a side elevational view showing the same slide plate, FIG. 16 is a cross-sectional view showing a state of an engagement between the chassis and the slide plate, FIG. 17 is a plan view showing a holder, FIG. 18 is a rear elevational view showing the same holder, FIG. 19 is a side elevational view showing the same holder, FIG. 20 is an explanatory view showing a state in which the same holder is drawn in its shape from a base material, and FIG. 21 is a perspective view showing a principal portion of a shutter opening and closing mechanism.

As shown in FIGS. 1 to 4, the magnetic recording/reproducing apparatus according to this embodiment is composed of an upper cover 1 and a lower cover 2, which are integrally joined to each other to form a housing, a mechanism body accommodated within the upper and lower covers 1, 2, and a front plate 3 attached to an opening made in the front sides of the upper and lower covers 1, 2. The front plate 3 is provided with an insertion opening 3a having a horizontally elongated configuration and further is equipped with an eject button 4 movable inwardly and outwardly which will be described later. In addition, a door 5 is rotatably supported by a rear side of the front plate 3 and is biased by a coil spring, not shown, in a direction of closing the insertion opening 3a.

Figure 5:
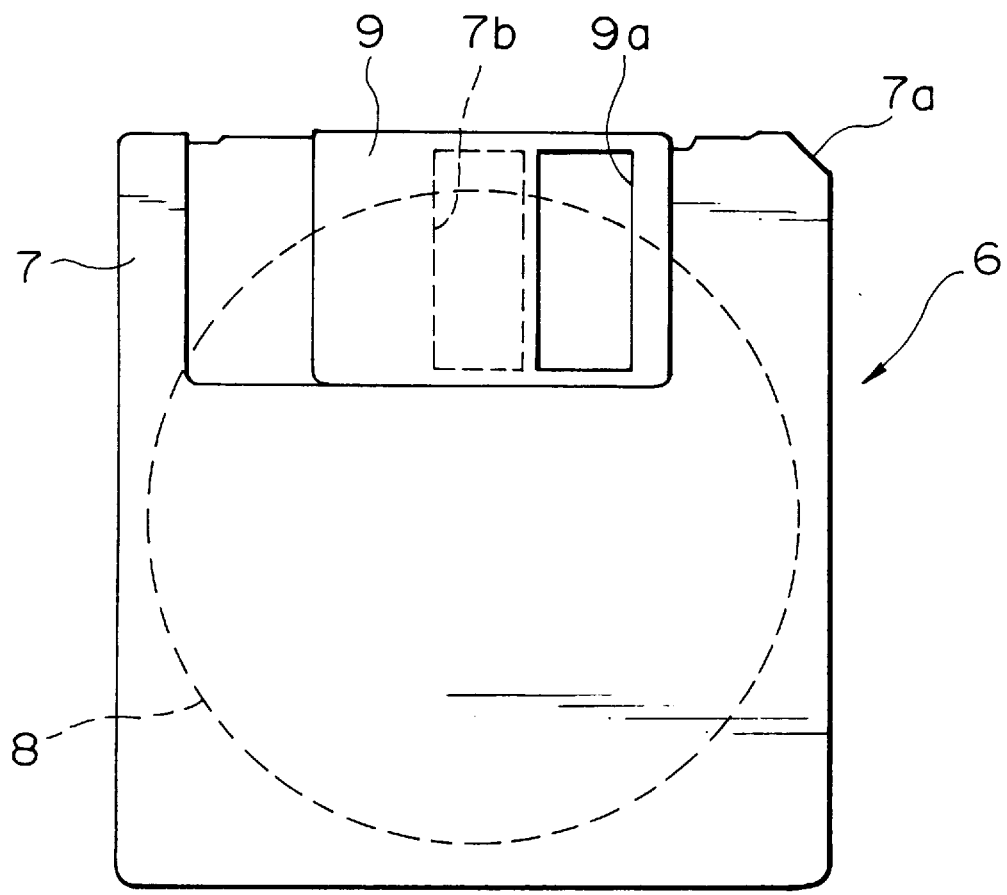
FIG. 5 is a plan view showing a disk cartridge.

A disk cartridge 6 used in this magnetic recording/reproducing apparatus is of a well-known type and, as shown in FIG. 5, comprises a cartridge case 7 made of an engineering plastic, a magnetic disk 8 rotatably accommodated within this cartridge case 7, and a shutter 9 allowed to reciprocate along one side edge of the cartridge case 7. One corner portion of the cartridge case 7 is cut off in a tapered fashion to define a wrong-way insertion preventing section 7a. The shutter 9 is bent into an angular configuration to form two sections arranged vertically in parallel to each other, and each of the upper and lower sections of the shutter 9 has a rectangular window hole 9a. In addition, the cartridge case 7 has an opening 7b corresponding to these window holes 9a. This shutter 9 is biased by a spring (not shown) in a direction of closing the opening 7b, while it is shifted by a shutter opening and closing mechanism (which will be described later) in a direction that the opening 7b aligns with the window holes 9a in response to the insertion of the disk cartridge 6 through the insertion opening 3a of the front plate 3, so that the magnetic disk 8 appears from the opening 7b and the window holes 9a.

As shown in FIGS. 6 to 9, the aforesaid mechanism body includes a chassis 10 fixedly secured to an upper surface of the lower cover 2, a slide plate 11 placed on an upper surface of the chassis 10 to be movable forwardly and rearwardly, and a holder 12 held by the slide plate 11. A detailed description will be taken hereinbelow about the structures of the chassis 10, the slide plate 11 and the holder 12.

The aforesaid chassis 10 is built using a material made by zinc-plating the upper and lower surfaces of a steel plate being a base material. As shown in FIGS. 10 to 12, the front and rear end portions of the chassis 10 are bent to form rising walls 10a, 10b, and a circular hole 10c is bored in the vicinity of the front side rising wall 10a. Further, around the circular hole 10c a plurality of guide projections 10d are made in a L-shaped fashion bent at right angles to the bottom surface, and two of the guide projections 10d are disposed in one side of the chassis 10; four in total in both the right and left sides. Still further, a plurality of protruding portions 10e are made on the bottom surface of the chassis 10 to protrude upwardly. These protruding portions 10e are located near the respective guide projections 10d, preferably disposed within a distance of 10 mm therefrom. Each of the protruding portions 10e is formed by press-processing the chassis 10 in a direction of its thickness and, as mentioned above, the chassis 10 is zinc-plated beforehand, and hence each of the protruding portions 10e has a flat surface zinc-plated. Moreover, the bottom surface of the chassis 10 is equipped with a plurality of reinforcing ribs 10f, and further is provided with two stopper projections 10g bent and formed for determining the falling position of the disk cartridge 6, a supporting wall 10h bent and formed to be located in opposed relation to the rear side rising wall 10b to establish a given separation therefrom, and so on. Furthermore, notch portions 10i are made both right and left side surfaces of the chassis 10, and a screw hole 10j is made in the rear side rising wall 10b.

As well as the aforesaid chassis 10, the slide plate is built with a material made by zinc-plating the upper and lower surfaces of a steel plate being a base material. As shown in FIGS. 13 to 15, this slide plate 11 is bent to have a U-shaped cross section, and an opening 11a is bored in a central portion of its bottom surface. In addition, a fitting piece 11b and a stopping claw 11c bent are disposed at front and rear side end portions of the slide plate 11, respectively, with the aforementioned eject button 4 being fitted to the fitting piece 11b. Further, a plurality of guide holes 11d and one insertion hole 11f are made in the bottom surface of the slide plate 11, while two cam channels 11e are made in one side surface of the slide plate 11; four cam channels 11e in both right and left sides thereof. This slide plate 11 is placed on the chassis 10 in a state that the guide projection 10d and one stopper projection 10g are inserted into each of the guide holes 11d and the other stopper projection 10g is inserted into the insertion hole 11f, and each of the guide holes 11d is restricted in position in vertical and horizontal directions by the corresponding guide projection 10d to be movable only in the forward and backward directions of the chassis 10 (see FIG. 9). In this case, as shown in FIG. 16 the lower surface of the slide plate 11 slides on the upper surfaces of the protruding portions 10e rising on the chassis 10, and since the lower surface of the slide plate 11 and the upper surfaces of the protruding portions 10e are subjected to the zinc-plating, the slide plate 11 can smoothly slide with respect to the chassis 10.

As well as the aforementioned chassis 10 and slide plate 11, the holder 12 is constructed with a material made by zinc-plating the upper and lower surfaces of a steel plate being a base material. As shown in FIGS. 17 to 19, this holder 12 is bent to assume a U-shaped cross section, and supporting pieces 12a are formed at lower end portions of both the side surfaces of the holder 12 in a bending way to be in opposed relation to the upper surface of the holder 12 to establish a given separation therebetween. Further, a swelling portion 12b slightly swelled upwardly is formed on the upper surface of the holder 12, and has an elongated hole 12c extending in the forward and rearward directions and an arcuate clearance hole 12d. A fall-out preventing projection 12e is bending-formed in the vicinity of the swelling portion 12b and further a stopping hole 12f is bored in the vicinity thereof. Still further, a stopper protruding piece 12g is formed at a front end portion of the upper surface of the holder 12, and the width dimension W1 of this stopper protruding piece 12g is set to be below the width dimension W2 of the elongated hole 12c, that is, (W1≦W2). Moreover, two projections 12h are formed in one side surface of the holder 12, that is, four projections 12h in both the side surfaces, besides suspending pieces 12i are formed to extend downwardly.

As shown in FIG. 20, the aforesaid holder 12 is formed into the above-mentioned configuration in such a way that its external shape is drawn from a flat plate like base material (a steel plate zinc-plated) and subsequently the bending-processing is made to the shape-drawn material. Since the relationship between the width dimension W1 of the stopper protruding piece 12g and the width dimension W2 of the elongated hole 12s is set to be W1≦W2 at the shape-drawing process, when the stopper protruding piece 12g formed in an arbitrary holder 12 is positioned within the elongated hole 12c formed in a different holder 12, it is possible to reduce the amount of scrap produced from the base material to the utmost. That is, the projecting portions remaining on the base material when shape-drawing the cavity-like elongated hole 12c are to be removed as scrap, but these portions can be used as the stopper protruding piece 12g of the different holder 12, thus reducing the useless portions of the base material.

Returning back to FIGS. 6 to 9, the aforesaid holder 12 is inserted into between both the side surfaces of the slide plate 11, and a tension spring 13 is stretched between the upper surface of the holder 12 and one side surface of the slide plate 11. The suspending piece 12i of the holder 12 penetrates the bottom surface of the slide plate 11 to come in the notch portion 10i of the chassis 10. Through the engagement between the suspending piece 12i and the notch portion 10i the holder 12 is restricted to be movable only in vertical directions with respect to the chassis 10. On the other hand, since as mentioned before the slide plate 11 is movable only in the forward and rearward directions of the chassis 10, the slide plate 11 is biased by the tension spring 13 toward the front end portion of the chassis 10. Further, At the back of the slide plate 11 and the holder 12 there is disposed a rotary member 14 which is rotatably supported by a supporting shaft 15 planted on the chassis 10 and is biased counter-clockwise in FIG. 6 by means of a torsion coil spring 16.

The aforesaid rotary member 14 is built by a plastic-molded material and, as shown in FIG. 21, is equipped with a cylindrical shaft portion 14a being inserted into the supporting shaft 15 and a pair of arm portions 14b, 14c protruding laterally from this shaft portion 14a. A pair of hook-like supporting walls 14d, 14e are installed on the upper end portion of the shaft portion 14a, and the aforesaid torsion coil spring 16 is wound around these supporting walls 14d, 14e. In this case, a pair of slits 14f extending axially are formed between both the supporting walls 14d, 14e, and the one supporting wall 14e is made to have a wall thickness thinner than that of the other supporting wall 14f, and hence the thin-thickness side supporting wall 14e is bent so that the winding portion of the torsion coil spring 16 can readily be fitted over the circumferences of both the supporting walls 14d, 14e. Further, a shutter opening and closing pin 14g is protrusively provided on a tip portion of one arm portion 14b. This shutter opening and closing pin 14g passes through the clearance hole 12d to arrive above the holder 12, and one end portion of the torsion coil spring 16 is held by the shutter opening and closing pin 14g. Still further, a locking claw 14h is formed at a tip portion of the other arm portion 14c to be attachable and detachable to and from the stopping claw 11c of the slide plate 11. The other end portion of the torsion coil spring 16 passes through the fall-out preventing projection 12e of the holder 12, and a bent portion 16a made at the tip of the other end portion thereof is hooked in the stopping hole 12f.

Figure 22:
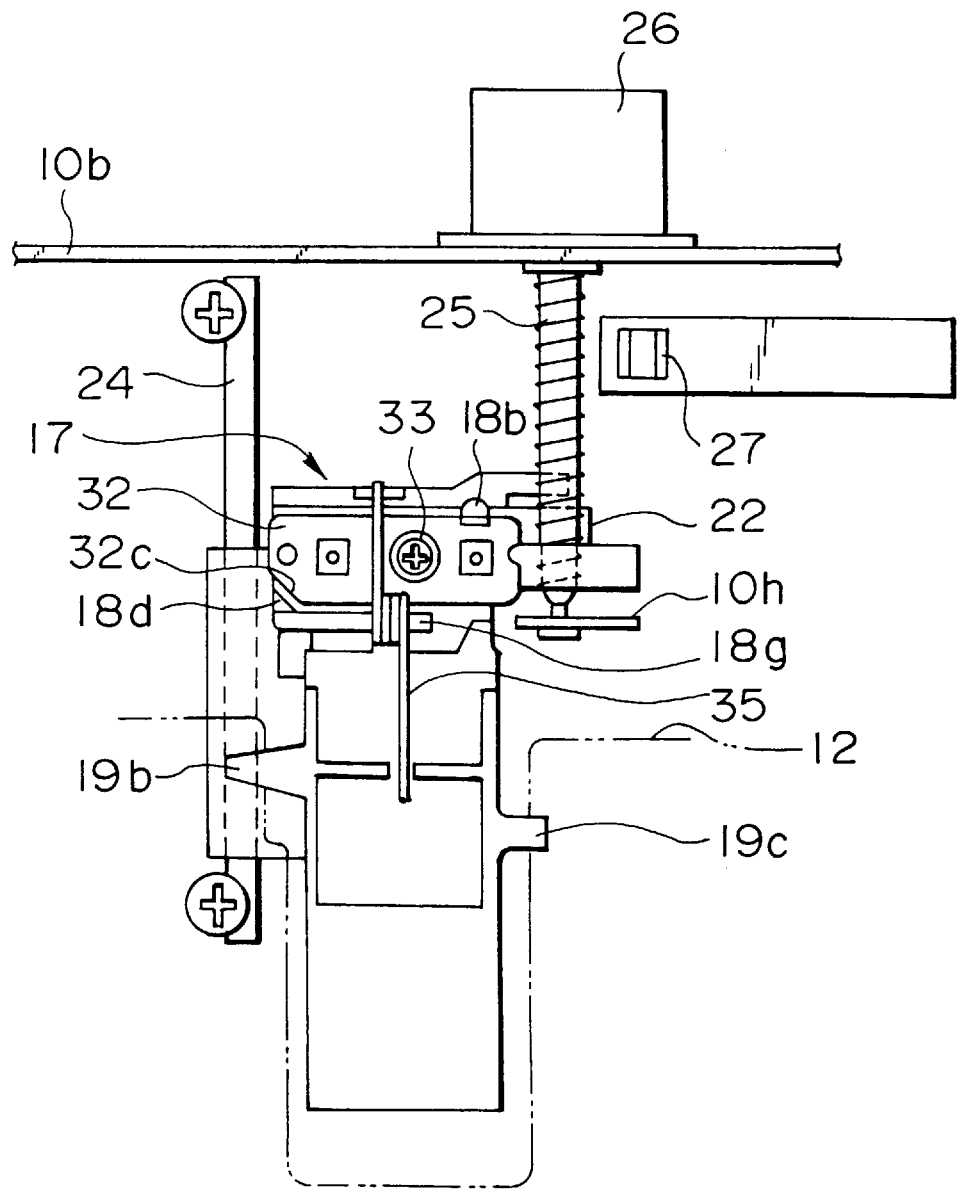
FIG. 22 is a plan view showing a head transferring mechanism provided in the magnetic recording/reproducing apparatus.
Figure 23:
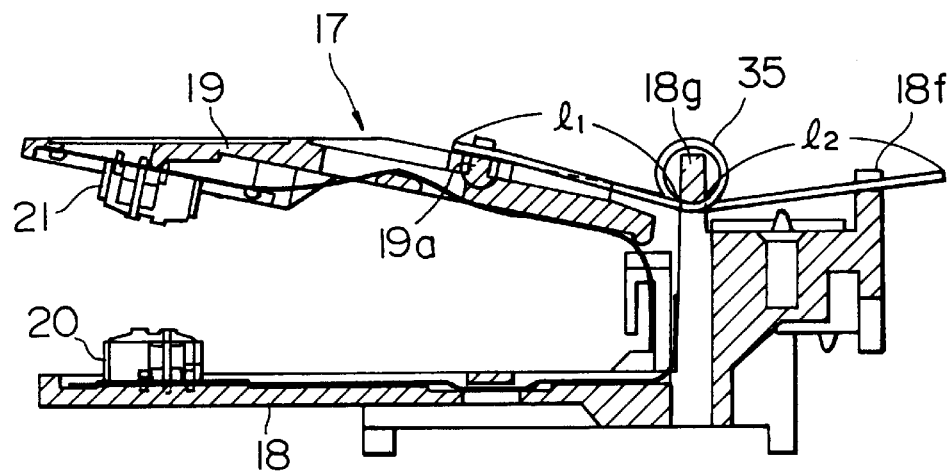
FIG. 23 is a cross-sectional view showing the same head transferring mechanism.
Figure 24:
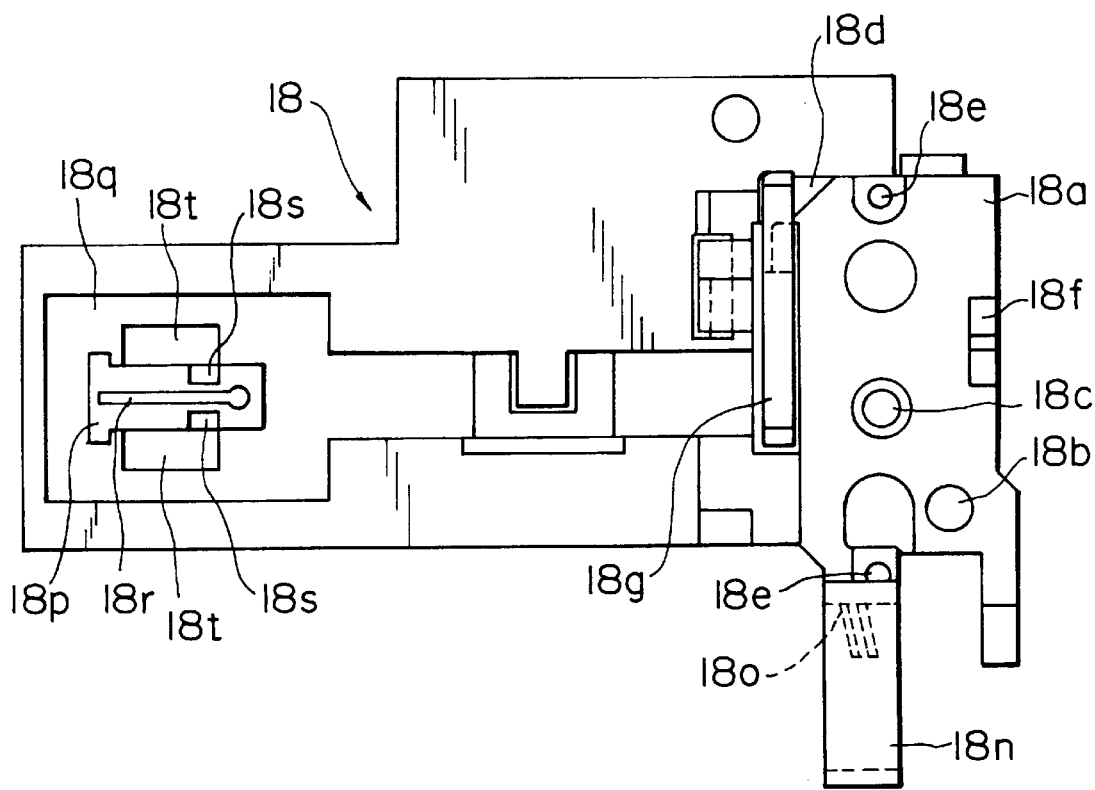
FIG. 24 is a plan view showing a carriage installed in the head transferring mechanism.
Figure 25:
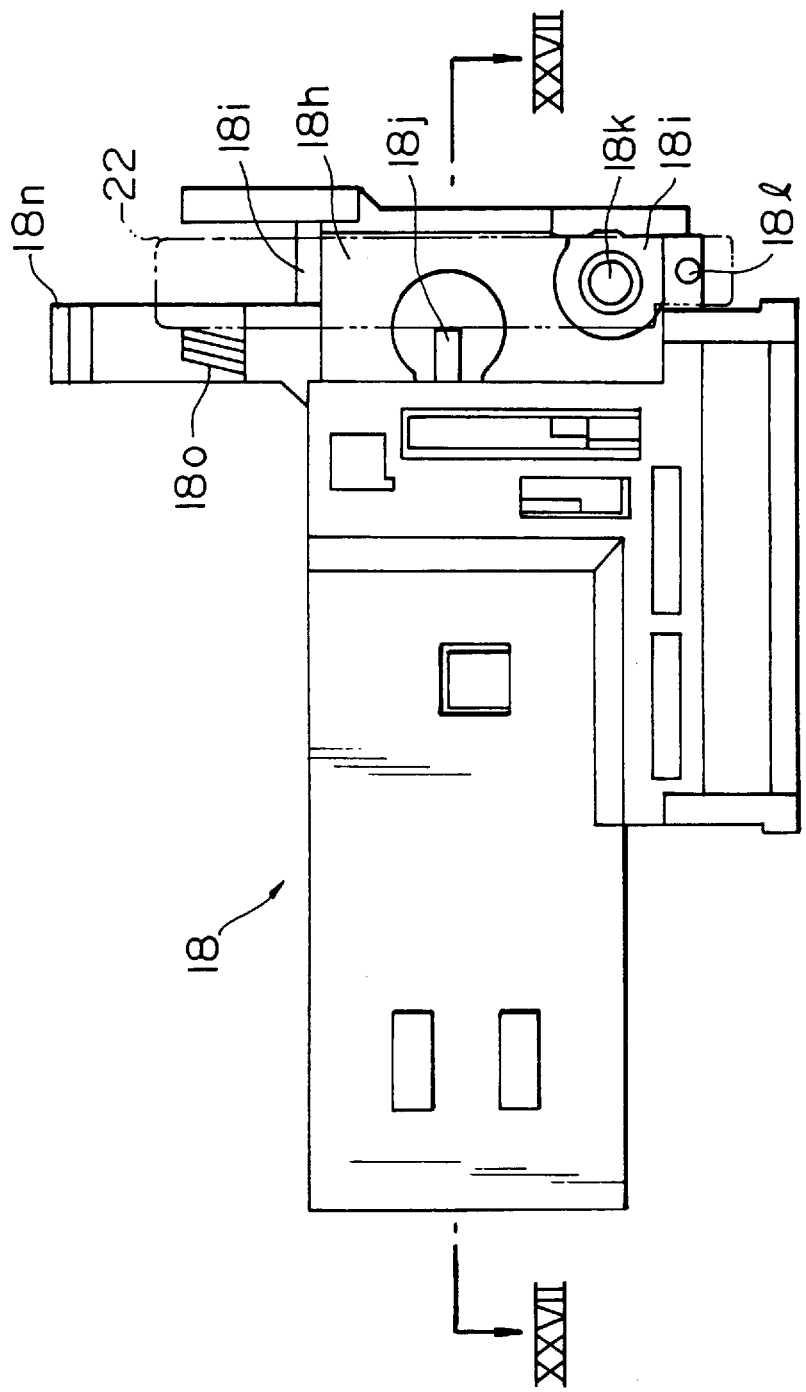
FIG. 25 is a back view showing the same carriage.
Figure 26:
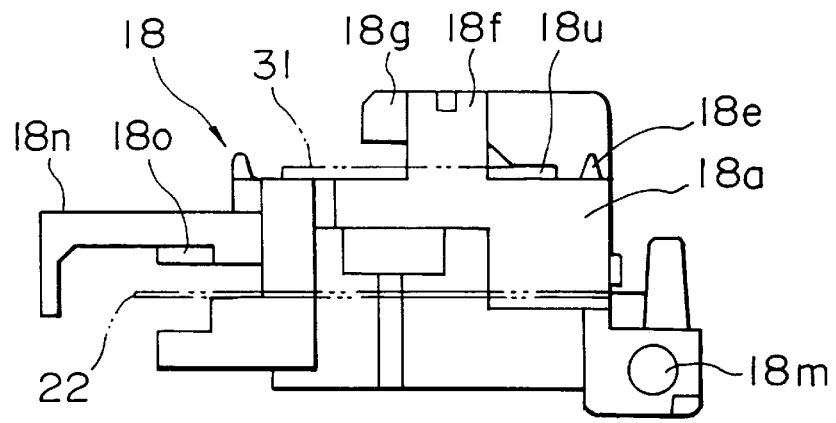
FIG. 26 is a rear elevational view showing the same carriage.
Figure 27:
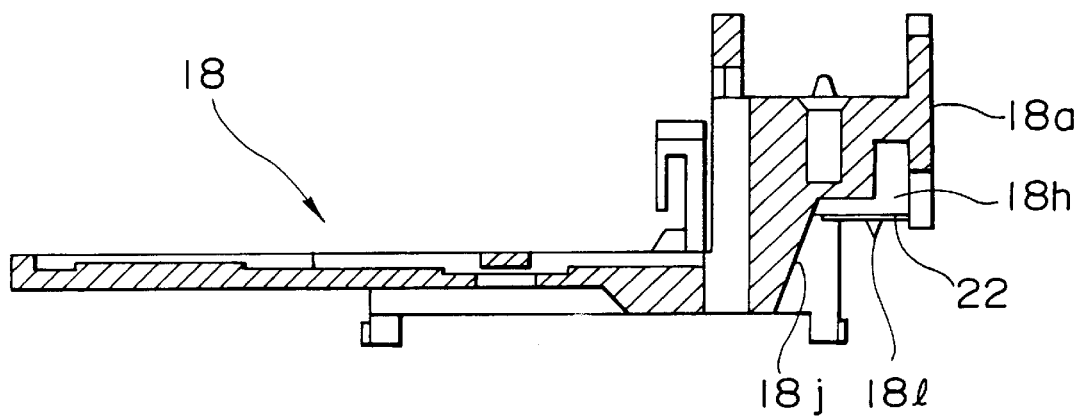
FIG. 27 is a cross-sectional view taken along a line XXVII—XXVII of FIG. 25.
Figure 28:
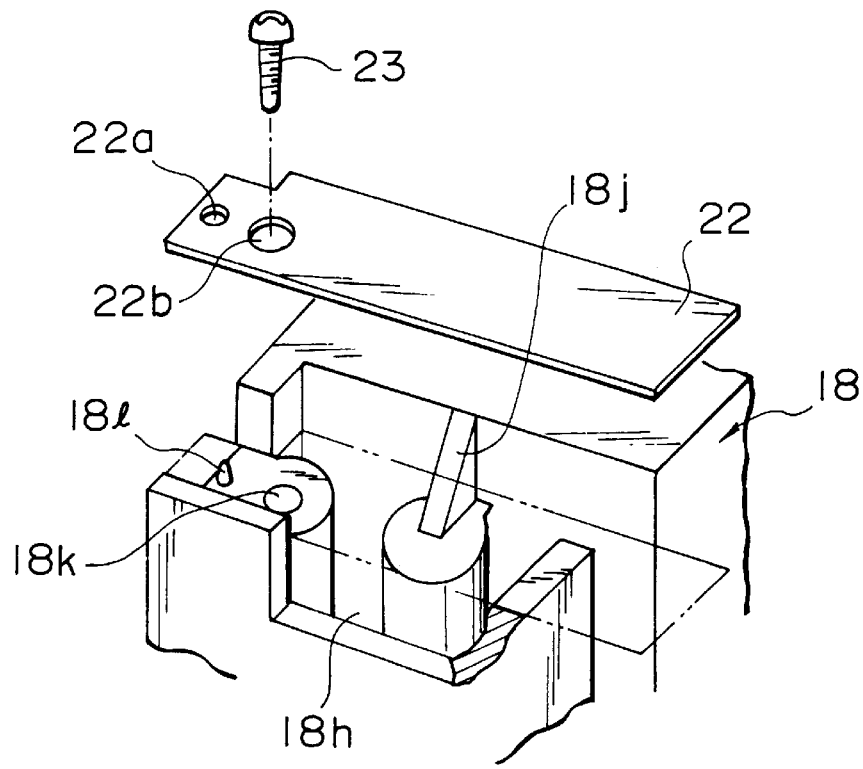
FIG. 28 is an explanatory view showing a state in which a follower spring is attached to the carriage.
Figure 29:
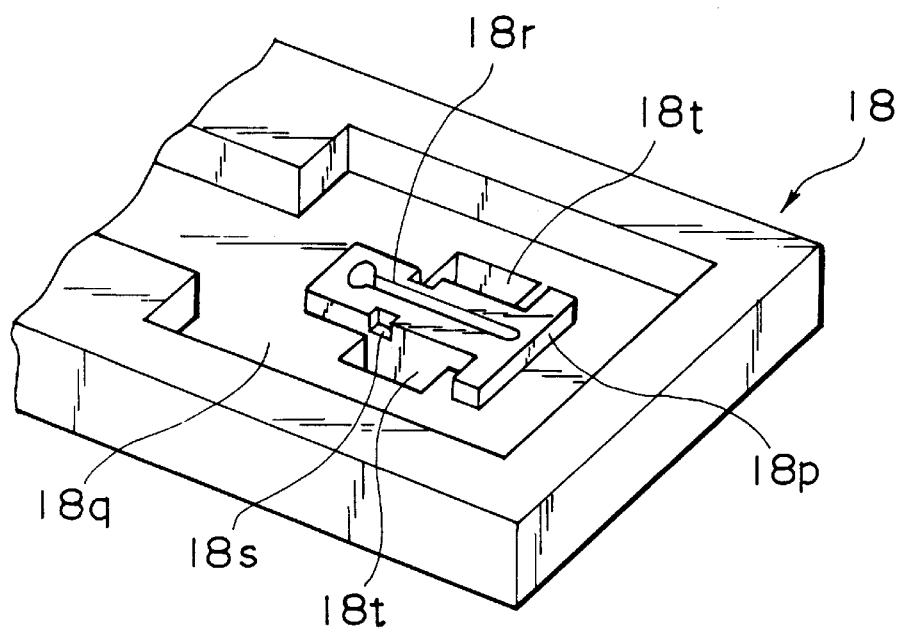
FIG. 29 is a perspective view showing a head fitting section of the carriage.
Figure 30:
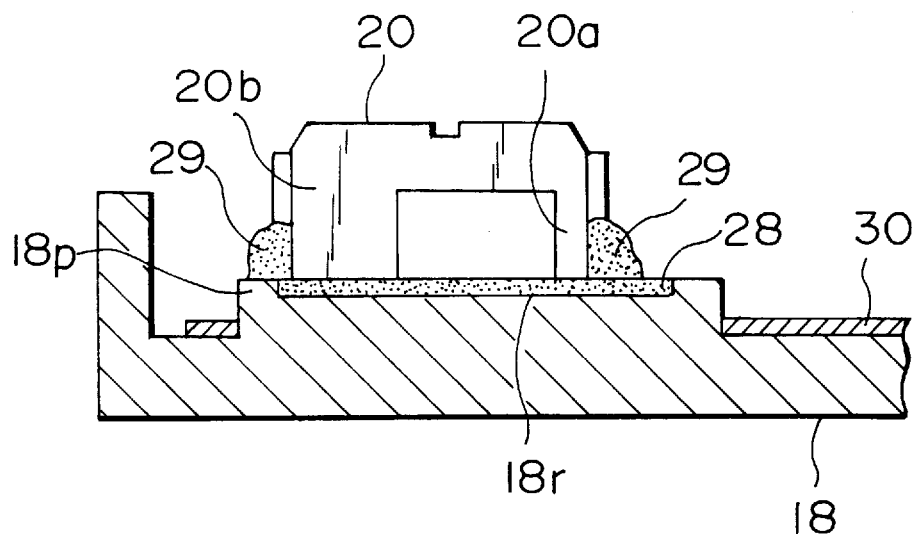
FIG. 30 is a cross-sectional illustration of a fitting state of the carriage and a lower magnetic head, viewed from their longitudinal direction.
Figure 31:
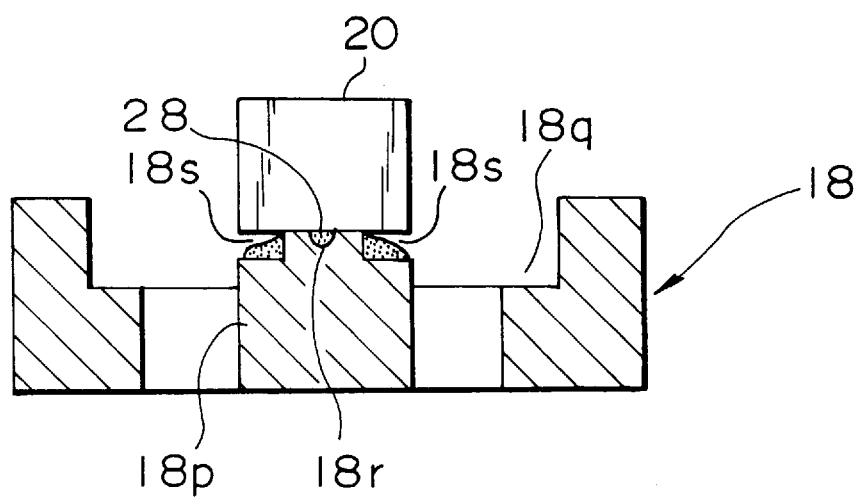
FIG. 31 is a cross-section viewed from their transverse direction.
Figure 32:
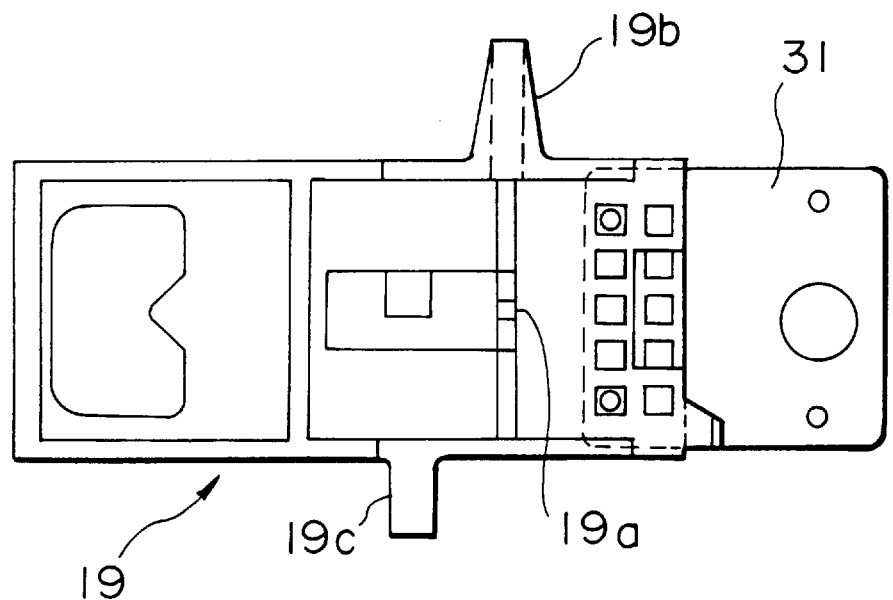
FIG. 32 is a plan view showing a hold case installed on the head transferring mechanism.
Figure 33:
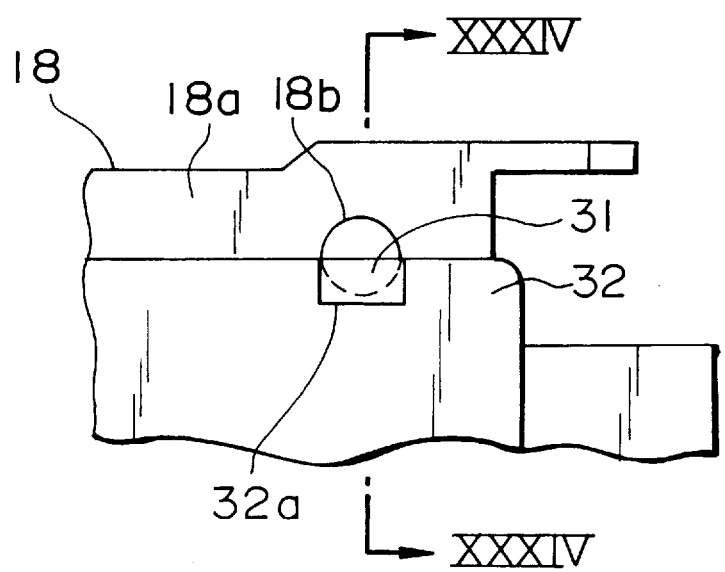
FIG. 33 is a plan view of principal portions of the hold case and a carriage fitting section.
Figure 34:
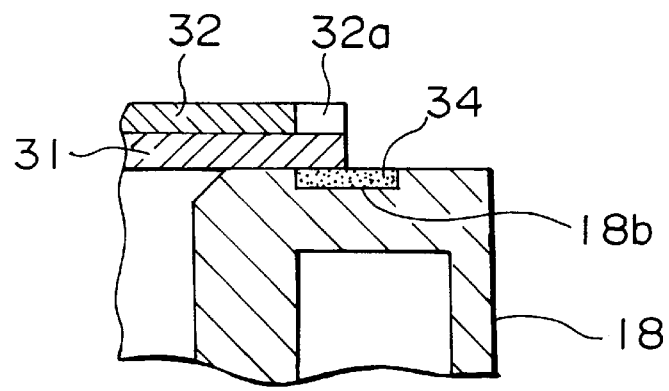
FIG. 34 is a cross-sectional view taken along a line XXXIV—XXXIV of FIG. 33.

FIG. 22 is a plan view showing a head transferring mechanism, FIG. 23 is a cross-sectional view showing the same head transferring mechanism, FIG. 24 is a plan view showing a carriage installed in the head transferring mechanism, FIG. 25 is a back view showing the same carriage, FIG. 26 is a rear elevational view showing the same carriage, FIG. 27 is a cross-sectional view taken along a line XXVII—XXVII of FIG. 25, FIG. 28 is an explanatory view showing a state in which a follower spring is attached to the carriage, FIG. 29 is a perspective view showing a head fitting section of the carriage, FIG. 30 is a cross-sectional illustration of a fitting state of the carriage and a lower magnetic head viewed from their longitudinal direction, FIG. 31 is a cross-section viewed from their transverse direction, FIG. 32 is a plan view showing a hold case installed on the head transferring mechanism, FIG. 33 is a plan view of principal portions of the hold case and a carriage fitting section, and FIG. 34 is a cross-sectional view taken along a line XXXIV—XXXIV of FIG. 33.

A head transferring mechanism 17 is placed behind the aforesaid chassis 10. As shown in FIG. 22, this head transferring mechanism 17 comprises a carriage 18 and a hold case 19 hinge-coupled above the carriage 18. The carriage 18 and the hold case 19 are made of a plastic material, and a lower magnetic head 20 is fixedly secured onto an upper surface of the carriage 18 while an upper magnetic head 21 is fixedly secured onto a lower surface of the hold case 19.

As illustrated in FIGS. 24 to 27, a stepped connecting section 18a is formed at a rear portion of the carriage 18, and an upper surface of the connecting section 18a has a circular groove 18b, a screw hole 18c, a regulating protruding portion 18d, a pair of positioning pins 18e, a spring bearing 18f, an L-shaped spring supporting portion 18g, and so on. In addition, in the rear side of the connecting section 18a, there are located a cavity portion 18h having an open lower surface, a pair of supporting portions 18i situated in opposed relation to each other through the cavity portion 18h, and a guide portion 18j inclined toward the cavity portion 18h. The one supporting portion 18i has a screw hole 18k and holds a positioning pin 18l. The lower surfaces of both the supporting portions 18i substantially define the same plane, and a follower spring 22 indicated by a two-dot chain line is fixed between these supporting portions 18i.

For the fitting of this follower spring 22, as shown in FIG. 28 the follower spring 22 is dropped onto both the supporting portions 18i from the rear side of the connecting section 18a in a state that the aforesaid carriage 18 is turned upside down, and subsequently the positioning pin 18l is inserted into a positioning hole 22a of the follower spring 22. Thereafter, a screw 23 is put in a through-hole 22b of the follower 22 to penetrate it and is engaged with the screw hole 18k, and when the screw 23 is tightened, the follower spring 22 is fixedly fitted on a rear surface of the connecting section 18a of the carriage 18. In this case, since the guide portion 18j is made in the open end of the cavity portion 18h, the follower spring 22 can surely be dropped onto both the supporting portions 18i along the guide portion 18j, with the result that the fitting of the follower spring 22 becomes easy.

Returning back to FIGS. 22 to 27, a penetration hole 18m is made in one side of the carriage 18, and is inserted into a guide shaft 24 fixed to the chassis 10 so that the carriage 18 is guided in the forward and backward directions of the chassis 10. In addition, an L-shaped arm 18n is formed on the other side of the carriage 18, and passes above a screw shaft 25 to reach a detection section 27 including a photo-interrupter located on the chassis 10. A height portion 18o is made on a rear surface of the L-shaped arm 18n, and this height portion 18o receives the elastic force of the follower spring 22 to engage with the screw shaft 25. The screw shaft 25 acts as a rotary shaft of a stepping motor 26 installed on the rear side rising wall 10b of the chassis 10, and the tip portion of the screw shaft 25 is supported by the supporting wall 10h of the chassis 10. Accordingly, when the screw shaft 25 is rotated by the stepping motor 26 being a drive source, the rotation of the screw shaft 25 is transmitted through the height portion 18o to the carriage 18 so that the carriage 18 shifts in the forward and rearward directions of the chassis 10, i.e., in the radial directions of the magnetic disk 8. At this time, a zero track signal is generated when the tip portion of the L-shaped arm 18n crosses the detection section 27.

As shown in FIGS. 29 to 31, a fitting bed 18p is situated on a tip central portion of the carriage 18, and a recessed portion 10q is made around the fitting bed 18p. In an upper surface of the fitting bed 18p there are formed an adhesive filling groove 18r extending in the longitudinal directions of the carriage 18 and clearance grooves 18s made in opposed relation to each other with the adhesive filling groove 18r being interposed therebetween. Further, penetration holes 18t are made in both sides of the fitting bed 18p, and one end portion of the adhesive filling groove 18r has a circular configuration which is wider than the width of the other end portion thereof. The lower magnetic head 20 is placed on the fitting bed 18p thus constructed, and the lower magnetic head 20 is fixed onto the fitting bed 18p through an adhesive 28 put in the adhesive filling groove 18r. In this instance, the circular wider portion being the one end portion of the adhesive filling groove 18r is positioned to separate from the lower magnetic head 20, and the adhesive 28 injected through the wider portion passes through the adhesive filling groove 18r to come on between the lower magnetic head 20 and the fitting bed 18p. In addition, since the adhesive filling groove 18r extends along a central portion of the lower surface of the lower magnetic head 20, the lower magnetic head 20 can be adhered and fixed to the fitting bed 18p with a good balance. Still further, the lower magnetic head 20 has a thin core portion 20a and a thick core portion 20b, whereas the thin core portion 20a having a lower rigidity than that of the thick core portion 20b steps over the adhesive filling groove 18r and is positioned above both the clearance grooves 18s. Thus, the excessive adhesive 28 flowing out through the lower surface of the lower magnetic head 20 is stored in these clearance grooves 18s. In consequence, the contact area between the thin core portion 20a and the fitting bed 18p becomes smaller, which prevents the thin core portion 20*a* from being broken or damaged by the hardening of the adhesive 28.

After the lower magnetic head 20 is fixed through the adhesive 28 to the fitting bed 18*p*, in the case that an adhesive 29 such as a UV resin is applied onto the circumference of the lower magnetic head 20, the fixing of the lower magnetic head 20 to the fitting bed 18*p* becomes more reliable (see FIG. 30). The lower magnetic head 20 thus adhered and fixed onto the fitting bed 18*p* of the carriage 18 is coupled to an FPC (flexible printed board) 30, while the FPC 30 passes through the recessed portion 18*q* and is guided up to a printed board 37 which will be described later.

As shown in FIG. 32, a spring bearing portion 19*a* is provided on an upper surface of the aforesaid hold case 19, and first and second supporting arms 19*b* and 19*c* are protrusively formed at both sides of the hold case 19. A lower surface of the first supporting arm 19*b* is positioned to be lower than a lower surface of the second supporting arm 19*c*, and in this embodiment the tip portion of the first supporting arm 19*b* is directed downwardly to form an L-shaped configuration so that the tip portion of the first supporting arm 19*b* protrudes downwardly with respect to the second supporting arm 19*c*. In addition, a leaf hinge spring 31 made from an elastic metallic plate is provided at the rear end portion of the hold case 19, with the hold case 19 and the leaf hinge spring 31 is integrally formed by the outsert molding technique. Further, the aforesaid upper magnetic head 21 is fixedly secured through a gimbal spring to the tip portion of the hold case 19, and is also coupled through an FPC to the printed board 37 which will be described later.

In the hold case 19 thus constructed, as shown in FIGS. 22 and 23, the leaf hinge spring 31 and a fitting plate 32 are plied up and placed on the connecting section 18*a* of the carriage 18 and subsequently a set screw 33 is engaged with the screw hole 18*c* of the connecting section 18*a* to hinge-connect them onto the connecting section 18*a* of the carriage 18. At this time, as shown in FIG. 26 one side edge of the leaf hinge spring 31 is inserted into a notch portion 18*u* made in a proximal portion of the spring supporting portion 18*g* of the carriage 18 and is placed on the connecting section 18*a*, with the result that it is pressed by the spring supporting portion 18*g*. In this state, the hold case 19 is slightly rotated against the tightening force of the set screw 33 to accomplish the alignment between the lower magnetic head 20 and the upper magnetic head 21 and subsequently the circular groove 18*b* of the carriage 18 is filled with an adhesive 34, so that the leaf hinge spring 31 is temporarily fixed to the connecting section 18*a*. In this case, since as shown in FIGS. 33 and 34 the leaf hinge spring 31 is placed on the connecting section 18*a* to substantially cover half of the circular groove 18*b*, the adhesive 34 can easily be supplied through the exposed portion of the circular groove 18*b* to between the carriage 18 and the leaf hinge spring 31. Moreover, since a notch portion 32*a* is made in the fitting plate 32 of the leaf hinge spring 31, the excessive adhesive 34 is reservoired within the notch portion 32*a* to prevent the undesirable flow-out of the adhesive 34. Incidentally, after the completion of the above-mentioned temporary fixing, the set screw 33 is strongly tightened to completely fix it. In this case, because the leaf hinge spring 31 is temporarily fixed to the connecting section 18*a* through the adhesive 34, the alignment between the lower magnetic head 20 and the upper magnetic head 21 is maintainable.

The fitting plate 32 is press-drawn from a flat metallic plate, while burrs occur on one surface of the fitting plate 32 at the press drawing. The heights of the burrs are uneven, and if the surface on which the burrs appear is used as a rear surface and the fitting plate 32 is placed on the connecting section 18*a* of the carriage 18, the tightening force of the set screw 33 does not uniformly work on the leaf hinge spring 31. For this reason, in this embodiment, as shown in FIG. 22 a cut-off portion 32*c* is made in one corner of the fitting plate 32 and the regulating protruding portion 18*d* of the carriage 18 is positioned in the cut-off portion 32*c*, thus providing an orientation to the fitting plate 32. Accordingly, in a state that the fitting plate 32 is placed on the connecting section 18*a* of the carriage 18, the burrs always turn upwardly, and the fitting plate 32 is made so as not to be incorporated into the carriage 18 when reversed.

Returning again to FIG. 22, a winding portion of a load spring is fitted over the spring supporting portion 18*g* of the carriage 18, and both free end portions of the load spring 35 are held by the spring bearings 18*f*, 19*a* so that the hold case 19 is resiliently biased toward the carriage 18. The load spring 35 is a torsion coil spring and the lengths $l_1$, $l_1$ from the winding portion to both the free end portions are set to be substantially equal to each other. Thus, there is no need to pay attention to its direction at the incorporation of the load spring 35, and hence improvement in work is possible. Further, the hold case 19 is positioned within the elongated hole 12*c* of the holder 12, and of the two supporting arms 19, 19*c* of the hold case 19, the first supporting arm 19*b* receives the elastic force of the load spring 35 to come into contact with the swelling portion 12*b* of the holder 12 while a given clearance is maintained between the second supporting arm 19*c* and the swelling portion 12*b*. In this case, since the the second supporting arm 19*c* is present at a position more remote from the lead hinge spring 31 with respect to the first supporting arm 19*b*, a necessary clearance is attained between the second supporting arm 19*c* and the swelling portion 12*b*, whereupon the thickness of the second supporting arm 19*c* is enlargeable within a possible range. Still further, the first supporting arm 19*b* comes into contact with the swelling portion 12*b* of the holder 22 virtually right above of the guide shaft 24 and the head transferring mechanism 17 is resiliently supported by the follower spring 22 at a position apart from the guide shaft 24, and hence the relief of the head transferring mechanism 17 including the carriage 18 is avoidable irrespective of the follower spring 22 with a small spring force.

Figure 35:
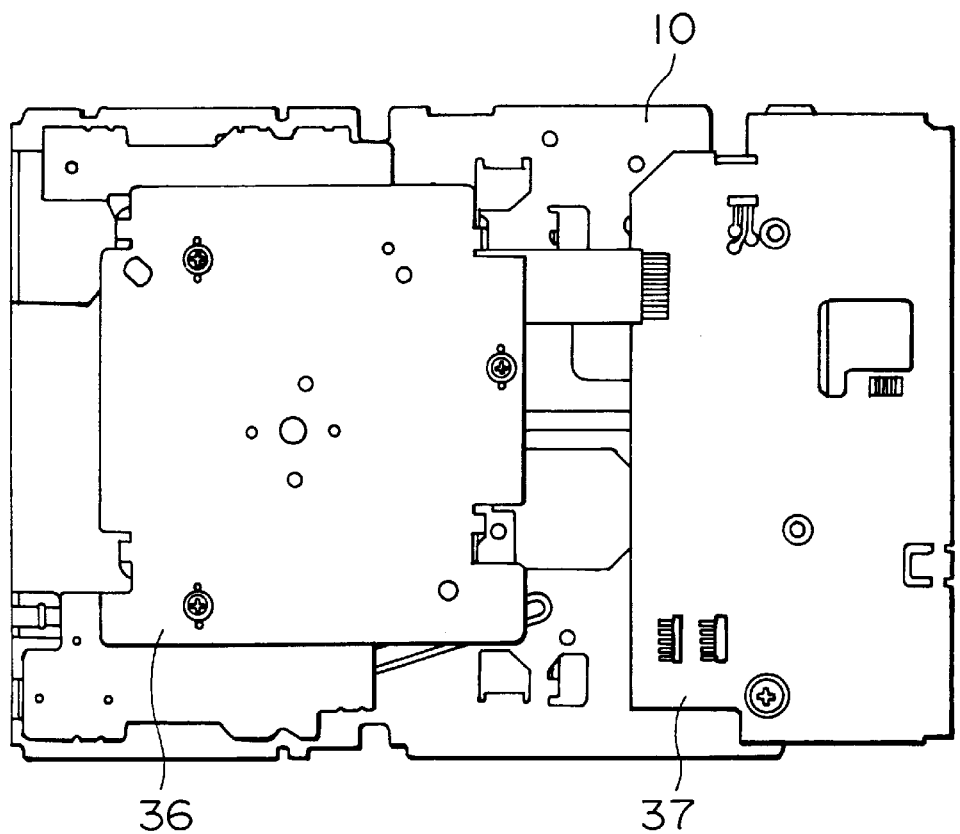
FIG. 35 is an illustration of the FIG. 10 chassis, viewed from the rear side.

FIG. 35 is an illustration of the aforesaid chassis viewed from its rear side, and as shown in this figure a subchassis 36 and the above-mentioned printed board 37 are fixedly secured onto the lower surface of the chassis 10. A spindle motor 38 is placed on the subchassis 36 (see FIG. 9), and this spindle motor 38 is electrically connected through a control board and an FPC to the printed board 37. On the printed board 37 there are packaged circuit devices including a drive circuit element for the stepping motor 27, the spindle motor 38 and so on, while as shown in FIG. 9 at the rear end portion of the upper surface thereof there are mounted two connectors 39, 40. These connectors 39, 40 are male connectors including pluralities of connecting pins 39*a*, 40*a*, respectively, and when female connectors 41 of external equipment, indicated by two-dot chain lines, are inserted into these connectors 39, 40, the magnetic recording/reproducing apparatus comes into connection with the external equipment.

Figure 36:
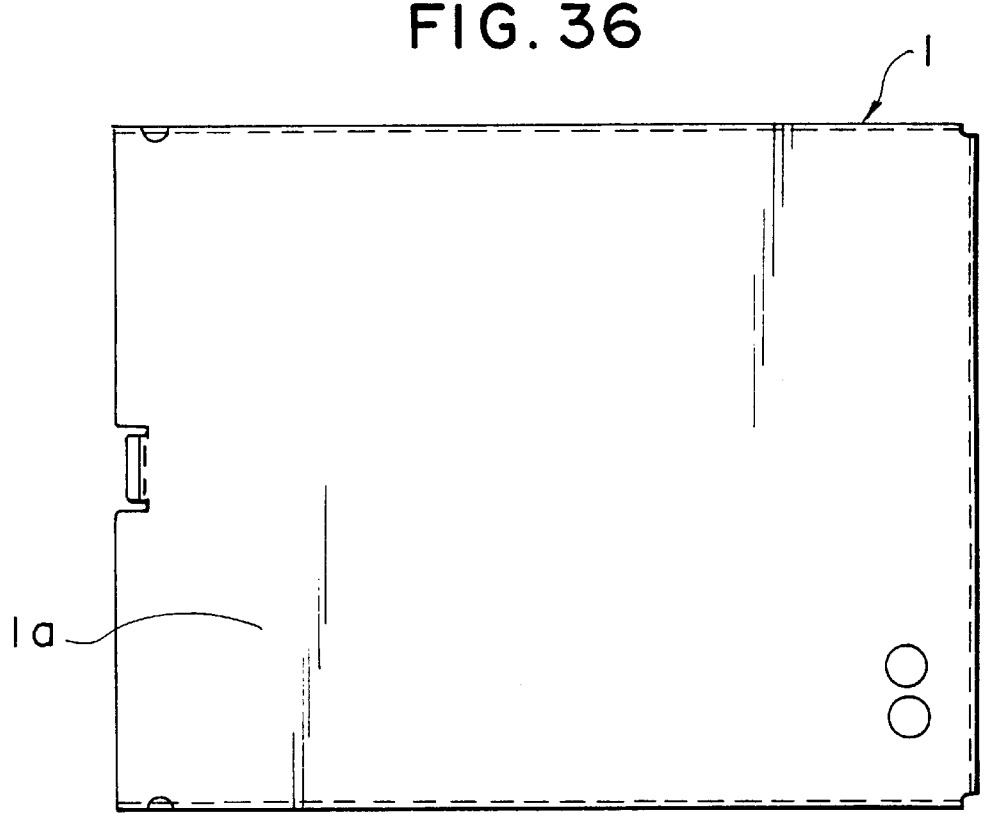
FIG. 36 is a plan view showing an upper cover fitted in the magnetic recording/reproducing apparatus.
Figure 37:
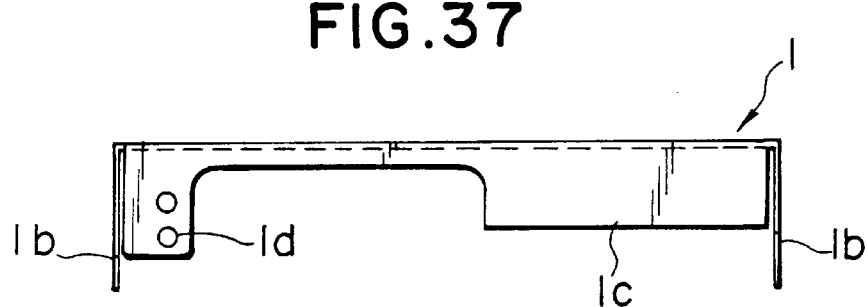
FIG. 37 is a rear elevational view showing the same upper cover.
Figure 38:
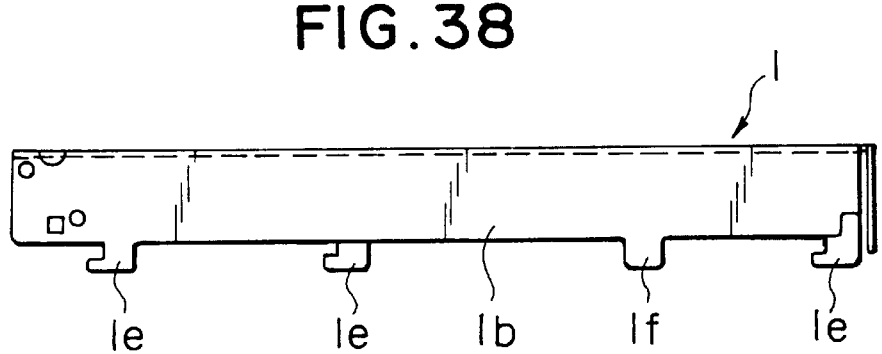
FIG. 38 is a side elevational view showing the same upper cover.
Figure 39:
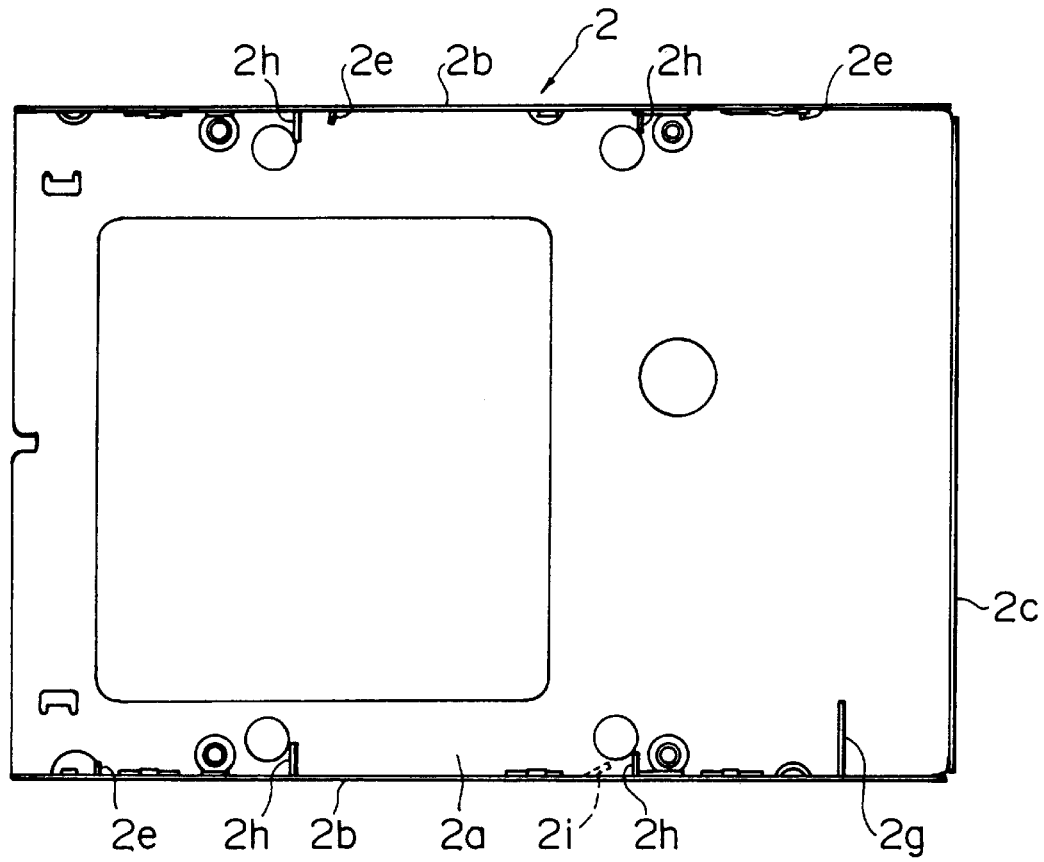
FIG. 39 is a plan view showing a lower cover fitted in the magnetic recording/reproducing apparatus.
Figure 40:
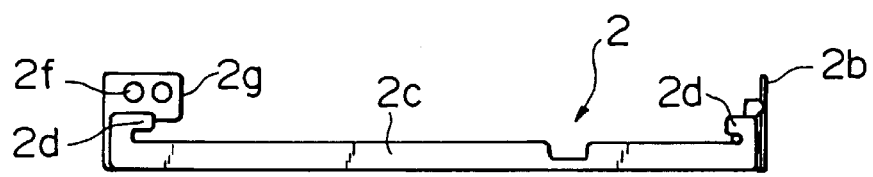
FIG. 40 is a rear elevational view showing the same lower cover.
Figure 41:
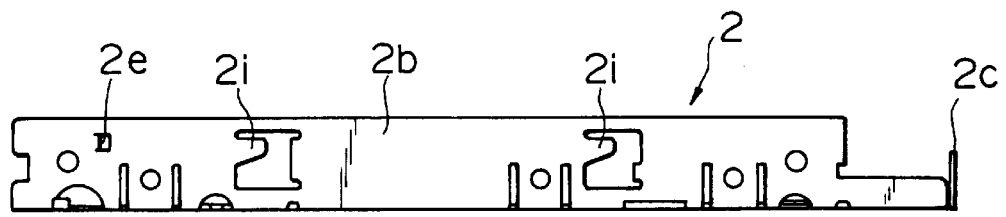
FIG. 41 is side elevational view showing the same lower cover.

FIG. 36 is a plan view showing the aforesaid upper cover, FIG. 37 is a rear elevational view showing the same upper cover, FIG. 38 is a side elevational view showing the same upper cover, FIG. 39 is a plan view showing the aforementioned lower cover, FIG. 40 is a rear elevational view showing the same lower cover, and FIG. 41 is a side elevational view showing the same lower cover.

As shown in FIGS. 36 to 38, the upper cover 1 is composed of a top surface 1*a* having a flat plate-like configuration, a pair of side surfaces 1*b* suspending from both side edge portions of the top surface 1*a*, and a rear surface 1*c* hanging from the rear end portion of the top surface 1*a*, with the side surfaces 1*b* and the rear surface 1*c* being bent at right angles to the top surface 1*a*. A through-hole(s) 1*d* is made in the rear surface 1*c*, and two L-shaped leg pieces 1*e* are formed at a lower end portion of the one side surface 16 while one L-shaped leg piece 1*e* and one angular suspending piece 1*f* are formed at a lower end portion of the other side surface 1*b*. These leg pieces 1*e* and suspending piece 1*f* are positioned to be shifted from one another in the forward and rearward directions of the upper cover 1. Accordingly, in cases where a number of upper covers 1 are taken from a flat metallic base material, when the leg pieces 1*e* and the suspending piece 1*f* to be formed on an arbitrary upper cover 1 are positioned between both the leg pieces 1*e* to be formed on another upper cover 1 or between the leg piece 1*e* and the suspending piece 1*f* to be formed thereon, it is possible to reduce the scrap produced from the base material to a minimum.

As shown in FIGS. 39 to 41, the aforesaid lower cover 2 is composed of a bottom surface 2*a* having a flat plate configuration, a pair of side surfaces 2*b* rising from both side edge portions of the bottom surface 2*a*, and a rear surface rising a rear end portion of the bottom surface 2*a*, with the side surfaces 2*b* and the rear surface 2*c* being bent at right angles to the bottom surface 2*a*. The height of the rear surface 2*c* is made to be sufficiently smaller than that of each of the side surfaces 2*b*, and a pair of regulating walls 2*d* are protrusively provided on an upper end portion of the rear surface 2*c*. Further, two stopping pieces 2*e* are formed on one side surface 2*b* while one stopping piece 2*e* and a bent piece 2*g* with a through-hole 2*f* are formed on the other side surface 2*b*. The formation of these stopping pieces 2*e* is accomplished in such a manner that the corresponding portions are bent at substantial right angles inwardly of the side surface 2*b* along a vertical line. In addition, two sets of supporting piece 2*h* and stopping piece 2*i* facing each other through an opening are formed on each of the side surfaces 2*b*, that is, four sets of supporting piece 2*h* and stopping piece 2*i* in both the right and left side surfaces 2*b*. The supporting piece 2*h* and the stopping piece 2*i* in each set are shifted from each other in the vertical directions, and the lower end portion of the stopping piece 2*i* is inclined upwardly. The stopping piece 2*i* is in a press-drawn condition, while the supporting piece 2*h* is bent inwardly of the side surfaces 2*b* at substantial right angles along a vertical line after the press drawing.

Figure 42:
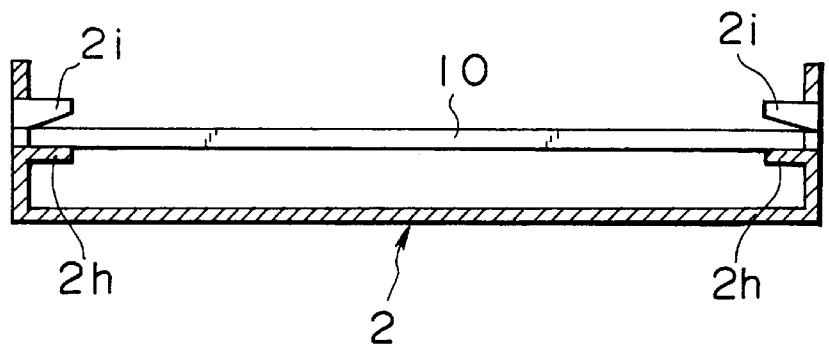
FIG. 42 is an explanatory view showing a fixing relationship between the lower cover and the chassis.

After the aforesaid mechanism body is fixedly secured onto the lower cover 2 thus arranged, the upper cover 1 is placed over the lower cover 2 and integrally joined to each other, thus establishing the magnetic recording/reproducing apparatus as mentioned before. In this case, as shown in FIG. 42 the chassis 10 of the mechanism body finished in assembling is inserted into the interior of the lower cover 2 and placed on the respective supporting pieces 2*h*, and subsequently the respective stopping pieces 2*i* are bent inwardly of the side surfaces 2*b* at substantial right angles so that the chassis 10 is held by each set of the stopping piece 2*i* and the supporting piece 2*h*, as shown in FIGS. 6 to 8. As obvious from these figures, the regulating walls 2*d* of the lower cover 2 are positioned beside the connectors 39, 40 mounted on the printed board 37. Accordingly, when the female connectors 41 of the external equipment are fitted into these connectors 39, 40, the lateral movements of the female connectors 41 are regulated by the regulating walls 2*d* so that the female connectors 41 are easily insertable into the connectors 39, 40.

Figure 43A:
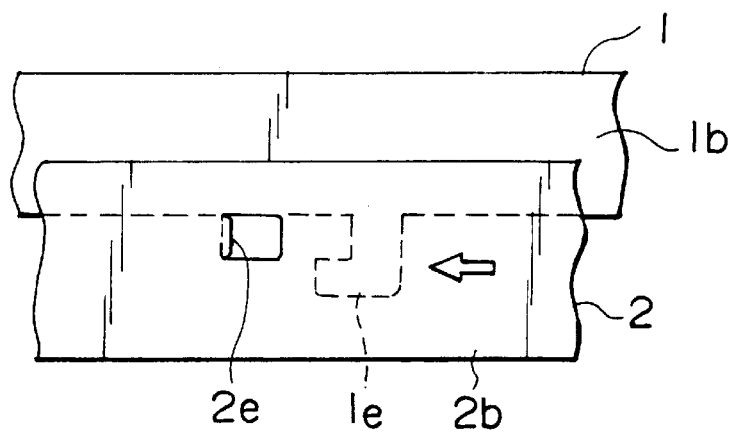
FIGS. 43A and 43B are explanatory views showing an assembling procedure for the upper cover and the lower cover.
Figure 43B:
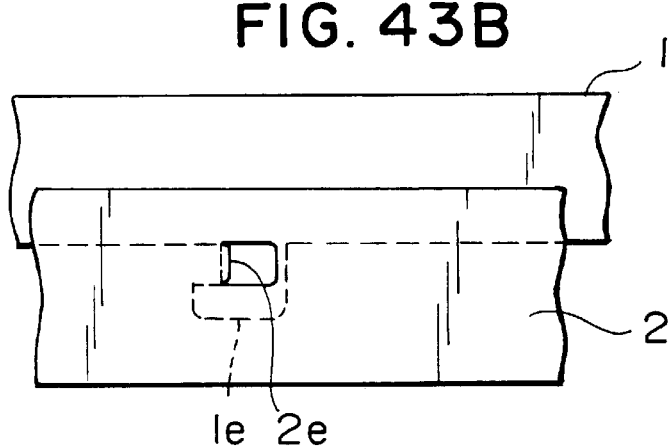
Figure 44:
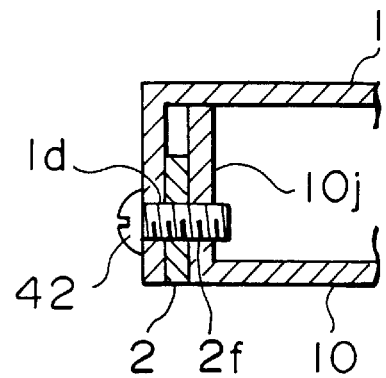
FIG. 44 is a cross-sectional view showing principal portions of the upper cover, the lower cover and a chassis fixing section.

Secondly, as shown in FIG. 43A both the side surfaces 1*b* of the upper cover 1 are inserted into between both the side surfaces 2*b* of the lower cover 2 and the upper cover 1 is pushed toward the rear end portion (an arrow direction) of the lower cover 2. At this time, as shown in FIG. 43B each of the stopping pieces 2*e* of the lower cover 2 are inserted into between the lower end portion of the side surface 1*b* of the upper cover 1 and the tip portion of the corresponding leg piece 1*e*, respectively, thus completing the connection between the upper and lower covers 1 and 2. In this case, since the leg piece 1*e* and the corresponding stopping piece 2*e* are press-drawn from the base material for the upper and lower covers 1 and 2, high dimensional accuracies are obtainable, and hence each of the leg pieces 1*e* can certainly be engaged with the corresponding stopping piece 2*e* regardless of the bending angle of the stopping piece 2*e*. In addition, the opening made at the press drawing of the stopping piece 2*e* is closed by the leg piece 1*e*, which achieves the shielding function against dust and magnetism. Thereafter, as shown in FIG. 44 a screw 44 is inserted into the through-hole 1*d* of the upper cover 1 and the through-hole 2*f* of the lower cover 2 to be engaged with the screw hole 10*j* of the chassis 10, with the result that the mechanism body including the chassis 10 and the upper and lower covers 1 and 2 are integrally joined to one another.

The operation of the magnetic recording/reproducing apparatus according to this embodiment constructed as described above is as follows.

Figure 45:
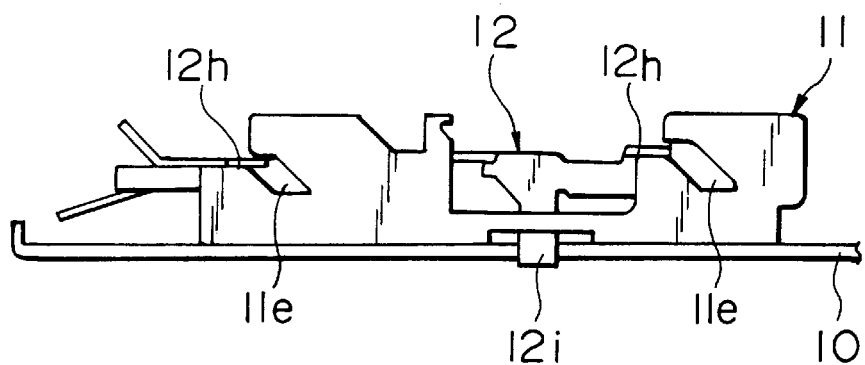
FIG. 45 is an explanatory view showing the relationship between the holder and the slide plate in an unloading condition.
Figure 46:
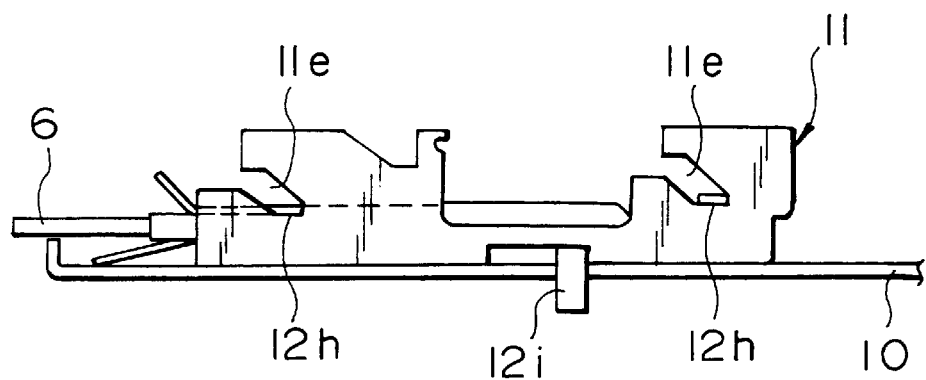
FIG. 46 is an explanatory view showing the relationship between the holder and the slide plate in a loading condition.

When the disk cartridge 6 is not mounted therein, the rotary member 14 is elastically biased by the torsion coil spring 16 to be at the position as shown in FIG. 6, and the locking claw 14*h* of the rotary member 14 is engaged with the stopping claw 11*c* of the slide plate 11, and hence the slide plate 11 stays at the retreating position. In this case, as shown in FIG. 45 the respective projections 12*h* of the holder 12 are held by the upper end portions of the respective cam channels 11*e* of the slide plate 11 so that the holder 12 is maintained at the raised position.

When the disk cartridge 6 is inserted through the insertion opening 3*a* of the front plate 3 into the interior of the apparatus, the door 5 is rotated by the disk cartridge 6, while the excessive rotation of the door 5 is restricted by making contact with the stopper protruding piece 12*g* of the holder 12. The disk cartridge 6 further advances and passes through between the upper surface of the holder 12 and the supporting piece 12*a* to run into the shutter opening and closing pin 14*g* of the rotary member 14, and during the insertion the bent portion 16*a* of the torsion coil spring 16 is deflected to the outside by the tapered wrong-way insertion preventing portion 7*a*. In the case that the disk cartridge 6 is turned upside down and inserted thereinto, the tip portion of the cartridge case 7 comes into contact with the bent portion 16*a*, thus inhibiting the further insertion of the disk cartridge 6.

Figure 47:
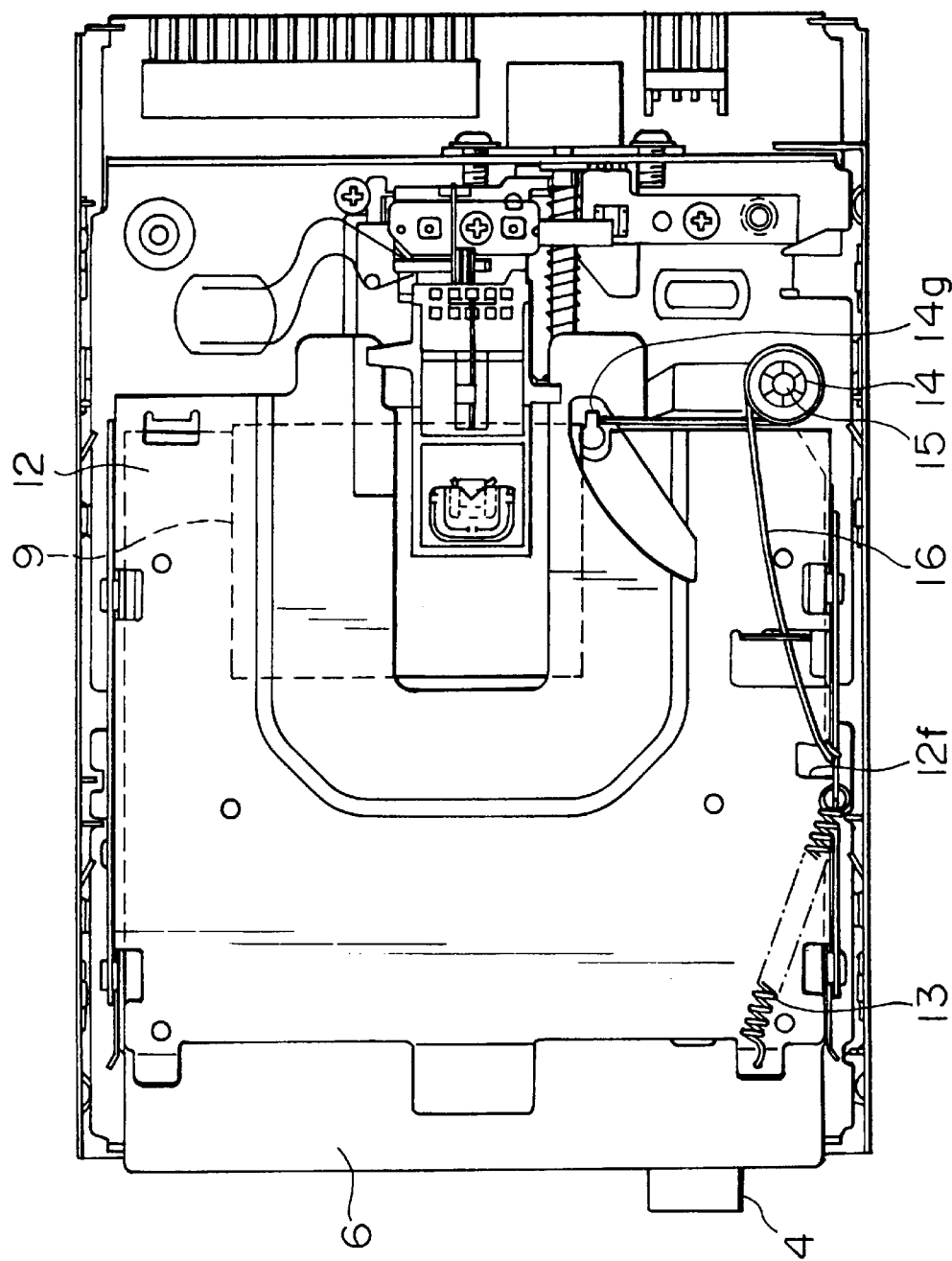
FIG. 47 is a plan view showing a loading state in FIG. 6.

Furthermore, when the disk cartridge 6 is put therein, as shown in FIG. 47 the rotary member 14 rotates clockwise in FIG. 6 against the elastic force of the torsion coil spring 16, and the tip portion of the disk cartridge 6 comes in between the carriage 18 and the hold case 19 of the head transferring mechanism 17. Since the shutter opening and closing pin 14*g* rotates within the through-hole 12*d* of the holder 12 in accompany of the rotation of the rotary member 14, the shutter 9 is shifted by the shutter opening and closing pin 14g so that the magnetic disk 8 within the cartridge case 7 is exposed through the opening 7b and the window holes 9a. In addition, since the engagement between the locking claw 14h and the stopping claw 11c is broken in accompany of the rotation of the rotary member 14, the slide plate 11 is shifted to the forward position by the tension spring 13 and the eject button 4 fixed in the fitting piece 11b of the slide plate 11 projects from the front plate 3. As a result, as shown in FIG. 45 each of the projections 12h of the holder 12 moves to the lower end portion of each of the cam channels 11e of the slide plate 11, while the holder 12, together with the disk cartridge 6, shifts to the downward position, i.e., the loading position. Still further, since the first supporting arm 19b is brought into contact with the swelling portion 12b of the holder 12, in accompany of the dropping of the holder 12 the hold case 19 biased by the load spring 35 also comes down, and the lower magnetic head 20 in the carriage 18 side and the upper magnetic head 21 in the hold case 19 side respectively come into contact with the magnetic disk 8. In this case, only the first supporting arm 19b comes into contact with the swelling portion 12b of the holder 12 and hence its reaction operates on the leaf hinge spring 31 as a torsion moment, whereas as described before one side edge portion of the leaf hinge spring 31 is pressed by the notch portion 18u of the spring supporting portion 18g so that it is possible to prevent the deformation of the leaf hinge spring 31. In case that a large external force is applied due to dropping or the like, the second supporting arm 19c of the hold case 19 runs into the swelling portion 12b of the holder 12, thus preventing the damages of both the magnetic heads 20 and 21 caused by the collision.

After the disk cartridge 6 is thus shifted up to the loading position, when the stepping motor 27 is driven to rotate the screw shaft 25, the rotation of the screw shaft 25 is transferred through the height portion 18o to the carriage 18 and the head transferring mechanism 17 moves in the radial directions of the magnetic disk 8 along the the guide shaft 24. Further, in response to the spindle motor 38 being driven, the magnetic disk 8 is rotated so that the lower magnetic head 20 and the upper magnetic head 21 perform the recording and reproduction of information on and from the magnetic disk 8.

Furthermore, in the case that the disk cartridge 6 is ejected from the loading position, when the eject button 4 protruding from the front plate 3 is pressed, the slide plate 11 is shifted to the retreating position against the elastic force of the tension spring 13. Thus, the holder 12 rises from the FIG. 46 loading position to the FIG. 45 unloading position, and by the rotary member 14 rotating counterclockwise in FIG. 47, the disk cartridge 6 is discharged from the insertion opening 3a of the front plate 3, and since the locking claw 14h of the rotary member 14 is held by the stopping claw 11c of the slide plate 11, the slide plate 11 again stays at the retreating position.

The present invention is not limited to the above-described embodiment but can take various modifications. For example, the adhesive injecting wider portion formed at the end portion of the adhesive filling groove 18r can be changed from the circular configuration to an angular configuration or the clearance groove 18s can also be made in both the thin core portion 20a and thick core portion 20b.

As described above, according to the present invention, the adhesive filling groove is made in the tip portion of the carriage and the magnetic head is placed on the carriage to cross the adhesive filling groove, more-over the lower surface of the magnetic head is adhered and fixed onto the carriage through the adhesive put in the adhesive filling groove. Thus, it is possible to omit the metallic plate essential in the prior art and further to provide a head transferring mechanism for a magnetic recording/reproducing apparatus which is easy in assembling and is manufactured at a low cost. In addition, the clearance groove is made in the vicinity of the adhesive filling groove and the clearance groove and a portion of the lower surface of the magnetic head are overlapped with each other in plane, and in this case the extra-adhesive overflows from the adhesive filling groove and passes through the lower surface of the magnetic head is stored in the clearance groove, with the result that the stress occurring at the time of the hardening of the adhesive is difficult to apply on the core of the magnetic head, thus preventing the damage of the core resulting from the hardening of the adhesive. Moreover, when the adhesive filling groove is positioned at the central portion of the lower surface of the magnetic head, the magnetic head can be adhered and fixed on the carriage with a good balance. Still further, if the end portion of the adhesive filling groove is made to have a large width and this wide portion is positioned outside the magnetic head, it is possible to achieve the improvement in work in putting the adhesive in the adhesive filling groove.

What is claimed is:

1. A head transferring mechanism for a magnetic recording/reproducing apparatus, comprising:

a carriage reciprocatively movable in radial directions relative to a magnetic disk, a magnetic head attached to a tip portion of said carriage;

a hold case hinge-connected to a rear end portion of said carriage; and a load spring for biasing said hold case toward said magnetic head, the load spring being attached to said carriage, wherein said carriage includes an adhesive filling groove at said tip portion and said magnetic head is placed on said carriage across said adhesive filling groove, with said magnetic head being secured onto said carriage through the use of an adhesive disposed in said adhesive filling groove; and wherein an end portion of said adhesive filling groove is formed to have a larger width than a central portion thereof covered by said magnetic head, and said larger-width end portion is positioned away from said magnetic head.

2. A head transferring mechanism for a magnetic recording/reproducing apparatus as defined in claim 1, wherein a clearance groove is made in the vicinity of said adhesive filling groove, and said clearance groove and a portion of a lower surface of said magnetic head are overlapped with each other in a plane.

3. A head transferring mechanism for a magnetic recording/reproducing apparatus as defined in claim 1, wherein said adhesive filling groove is positioned at a central portion of a lower surface of said magnetic head.

4. A head transferring mechanism for a magnetic recording/reproducing apparatus, comprising:

a carriage reciprocatively movable in a radial direction relative to a magnetic disk;

a fitting bed integrally formed in one end of said carriage, said fitting bed defining an adhesive filling groove extending in said radial direction;

a magnetic head including a thin core portion and a thick core portion, each of said thin core portion and said thick core portion having a central portion disposed above said adhesive filling groove and fixed to said fitting bed by an adhesive contained in said adhesive filling groove;

a hold case hinge-connected to a rear end portion of said carriage; and a load spring for biasing said hold case toward said magnetic head attached to said carriage.

5. A head transferring mechanism for a magnetic recording/reproducing apparatus according to claim 4, wherein said fitting bed further comprises a clearance groove for receiving excess adhesive, said clearance groove being disposed adjacent a first side of said adhesive filling groove and below said thin core portion of said magnetic head.

6. A head transferring mechanism for a magnetic recording/reproducing apparatus according to claim 5, wherein said fitting bed further comprises a second clearance groove disposed adjacent a second side of said adhesive filling groove, said second side being opposite said first side.

7. A head transferring mechanism for a magnetic recording/reproducing apparatus according to claim 4, further comprising a flexible printed board coupled to said magnetic head, wherein said carriage defines a recessed portion surrounding said fitting bed, for guiding said flexible printed board.

* * * * *